United States Patent
Ang et al.

(10) Patent No.: US 11,832,223 B2
(45) Date of Patent: *Nov. 28, 2023

(54) SCHEDULING APPLICATION DELAY

(71) Applicant: QUALCOMM Incorporated, San Diego, CA (US)

(72) Inventors: Peter Pui Lok Ang, San Diego, CA (US); Wooseok Nam, San Diego, CA (US); Huilin Xu, Temecula, CA (US); Muhammad Sayed Khairy Abdelghaffar, San Jose, CA (US); Hung Dinh Ly, San Diego, CA (US); Aamod Dinkar Khandekar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,825

(22) Filed: Sep. 23, 2022

(65) Prior Publication Data

US 2023/0039700 A1 Feb. 9, 2023

Related U.S. Application Data

(63) Continuation of application No. 17/039,610, filed on Sep. 30, 2020, now Pat. No. 11,483,822.

(Continued)

(51) Int. Cl.
*H04W 72/044* (2023.01)
*H04W 72/23* (2023.01)

(52) U.S. Cl.
CPC ......... *H04W 72/044* (2013.01); *H04W 72/23* (2023.01)

(58) Field of Classification Search
CPC .................. H04W 72/044; H04W 72/1289
See application file for complete search history.

(56) References Cited

U.S. PATENT DOCUMENTS 11,483,822 B2 * 10/2022 Ang ................. H04W 72/23
2019/0230701 A1 * 7/2019 Golitschek Edler Von Elbwart ............ H04L 1/0061
(Continued)

FOREIGN PATENT DOCUMENTS

WO 2019031954 A1 2/2019

OTHER PUBLICATIONS

Ericsson: "Feature Lead Summary#2 on Resource Allocation for NR Sidelink Mode 1", 3GPP Draft, R1-1909797—Feature Lead Summary#2 on Resource Allocation for NR Sidelink Mode 1, 3rd Generation Partnership Project (3GPP), Mobile Competence Centre, 650, Route Des Lucioles, F-06921, SO, vol. RAN WG1, No. Prague, CZ, Aug. 26, 2019-Aug. 30, 2019, Sep. 3, 2019 (Sep. 3, 2019), XP051766389, 34 pages, Retrieved from the Internet: URL: http://www.3gpp.org/ftp/tsg_ran/WG1_RL1/TSGR1_98/Docs/R1-1909797.zip. [retrieved on Sep. 3, 2019].

(Continued)

*Primary Examiner* — Kashif Siddiqui
(74) *Attorney, Agent, or Firm* — Patterson & Sheridan, L.L.P/Qualcomm Incorporated

(57) ABSTRACT

Certain aspects of the present disclosure provide techniques for managing scheduling of wireless communications. A method that may be performed by a user equipment (UE) includes receiving, from a base station, one or more configurations indicating a plurality of minimum scheduling offset values; receiving, from the base station, a signal indicating one of the minimum scheduling offset values as an updated value to be used for communications with the base station and a type of scheduling; determining a delay based on the type of scheduling; and after the reception of (Continued)

the signal, using the updated value for communications with the base station based on the determined delay.

28 Claims, 15 Drawing Sheets

Related U.S. Application Data

(60) Provisional application No. 62/976,856, filed on Feb. 14, 2020, provisional application No. 62/911,164, filed on Oct. 4, 2019, provisional application No. 62/909,223, filed on Oct. 1, 2019.

(56) References Cited

U.S. PATENT DOCUMENTS

| | | | |
|---|---|---|---|
| 2019/0239093 A1* | 8/2019 | Zhang | .................. H04L 5/001 |
| 2020/0120708 A1* | 4/2020 | Liu | .................. H04L 5/0098 |
| 2020/0177424 A1 | 6/2020 | Noh et al. | |
| 2020/0236692 A1* | 7/2020 | Lin | .................. H04W 72/0446 |
| 2021/0099985 A1 | 4/2021 | Ang et al. | |

OTHER PUBLICATIONS

International Search Report and Written Opinion—PCT/US2020/053780—ISA/EPO—dated Nov. 26, 2020.

* cited by examiner

BWP Switch Delay = {1 Slot @15kHz SCS, 2 Slots @30kHz SCS}
BWP0 (15kHz SCS): TDRA-configured K0 = {2, ...}
Minimum Scheduling Offset (X): 2->0 Slot
BWP1 (30kHz SCS): TDRA-configured K0 = {4, 0,...}
Minimum Scheduling Offset (X): 0 Slot

SCHEDULING APPLICATION DELAY

CROSS-REFERENCE TO RELATED APPLICATIONS

The present Application for Patent is a continuation of U.S. Non-Provisional patent application Ser. No. 17/039,610, filed Sep. 30, 2020, which claims priority to and benefit of U.S. Provisional Patent Application No. 62/909,223, filed Oct. 1, 2019; U.S. Provisional Patent Application No. 62/911,164, filed Oct. 4, 2019; and U.S. Provisional Patent Application No. 62/976,856, filed Feb. 14, 2020, each of which is hereby expressly incorporated by reference herein in its entirety.

BACKGROUND

Field of the Disclosure

Aspects of the present disclosure relate to wireless communications, and more particularly, to techniques for managing transmission scheduling.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable scheduling of wireless communications.

Certain aspects provide a method for wireless communication by a user equipment (UE). The method generally includes receiving, from a base station, one or more configurations indicating a plurality of minimum scheduling offset values and receiving, from the base station, a signal indicating one of the minimum scheduling offset values as an updated value to be used for communications with the base station and a type of scheduling. The method also includes determining a delay based on the type of scheduling and after the reception of the signal, using the updated value for communications with the base station based on the determined delay.

Certain aspects provide a method for wireless communication by a base station (BS). The method generally includes selecting one of a plurality minimum scheduling offset values as an updated value to be used for communications with a UE and transmitting, to the UE, a signal indicating the updated value and a type of scheduling. The method further includes determining a delay based on the type of scheduling and after the transmission of the signal, using the updated value for communications with the UE based on the determined delay.

Certain aspects provide an apparatus for wireless communication. The apparatus generally includes a transceiver, a memory, and a processor. The transceiver is configured to receive, from a base station, one or more configurations indicating a plurality of minimum scheduling offset values, and receive, from the base station, a signal indicating one of the minimum scheduling offset values as an updated value to be used for communications with the base station and a type of scheduling. The processor is coupled to the memory, and the processor and the memory are configured to determine a delay based on the type of scheduling. The transceiver is further configured to communicate with the base station using the updated value based on the determined delay.

Certain aspects provide an apparatus for wireless communication. The apparatus generally includes a memory, a processor, and a transceiver. The processor is coupled to the memory, and the processor and the memory are configured to select one of a plurality minimum scheduling offset values as an updated value to be used for communications with a UE. The transceiver is configured to transmit, to the UE, a signal indicating the updated value and a type of scheduling. The processor and the memory are further configured to determine a delay based on the type of scheduling. After the transmission of the signal, the transceiver is configured communicate with the UE using the updated value based on the determined delay.

Certain aspects provide an apparatus for wireless communication. The apparatus generally includes means for receiving, from a base station, one or more configurations indicating a plurality of minimum scheduling offset values; means for receiving, from the base station, a signal indicating one of the minimum scheduling offset values as an updated value to be used for communications with the base station and a type of scheduling; means for determining a delay based on the type of scheduling; and means for using, after the reception of the signal, the updated value for communications with the base station based on the determined delay.

Certain aspects provide an apparatus for wireless communication. The apparatus generally includes means for selecting one of a plurality minimum scheduling offset values as an updated value to be used for communications with a UE; means for transmitting, to the UE, a signal indicating the updated value and a type of scheduling; means for determining a delay based on the type of scheduling; and means for using, after the transmission of the signal, the updated value for communications with the UE based on the determined delay.

Certain aspects provide a computer readable medium having instructions stored thereon for receiving, from a base station, one or more configurations indicating a plurality of minimum scheduling offset values; receiving, from the base station, a signal indicating one of the minimum scheduling offset values as an updated value to be used for communications with the base station and a type of scheduling; determining a delay based on the type of scheduling; and after the reception of the signal, using the updated value for communications with the base station based on the determined delay.

Certain aspects provide a computer readable medium having instructions stored thereon for selecting one of a plurality minimum scheduling offset values as an updated value to be used for communications with a UE; transmitting, to the UE, a signal indicating the updated value and a type of scheduling; determining a delay based on the type of scheduling; and after the transmission of the signal, using the updated value for communications with the UE based on the determined delay.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for scheduling wireless transmissions, including for example, a framework for determining when to apply an updated value of a minimum scheduling offset. Such a scheduling framework may improve the efficiency of wireless communications including reduced power consumption and/or reduced signaling overhead.

The following description provides examples of managing transmission scheduling in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
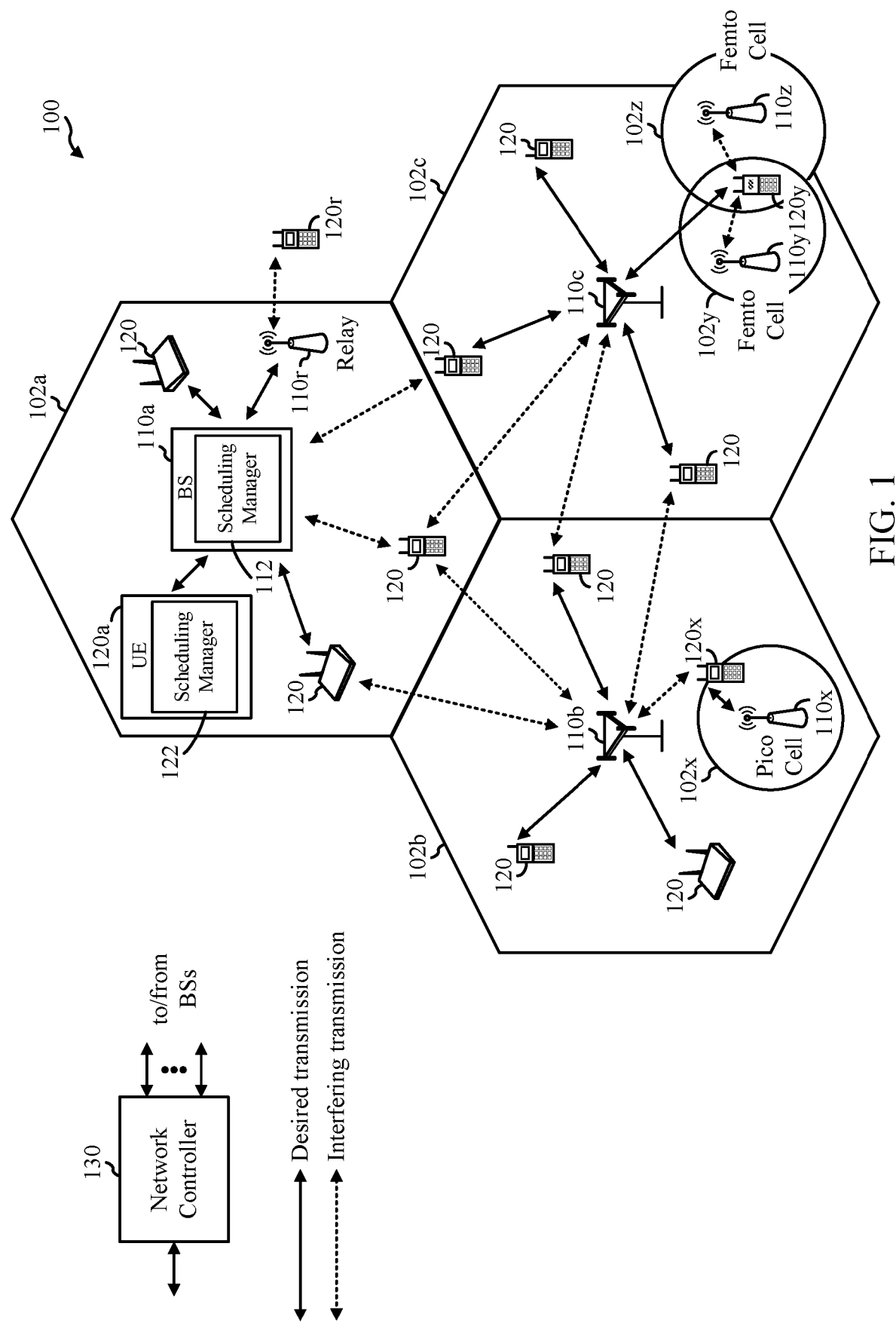
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network). As shown, the B S 110a includes a scheduling manager 112 that determines when to apply an updated value of a minimum scheduling offset (e.g., according to an application delay) and/or performs various other operations for managing scheduled transmissions, in accordance with aspects of the present disclosure. The UE 120a includes a scheduling manager 122 that determines when to apply an updated value of a minimum scheduling offset (e.g., according to an application delay) and/or performs various other operations for managing scheduled transmissions, in accordance with aspects of the present disclosure.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
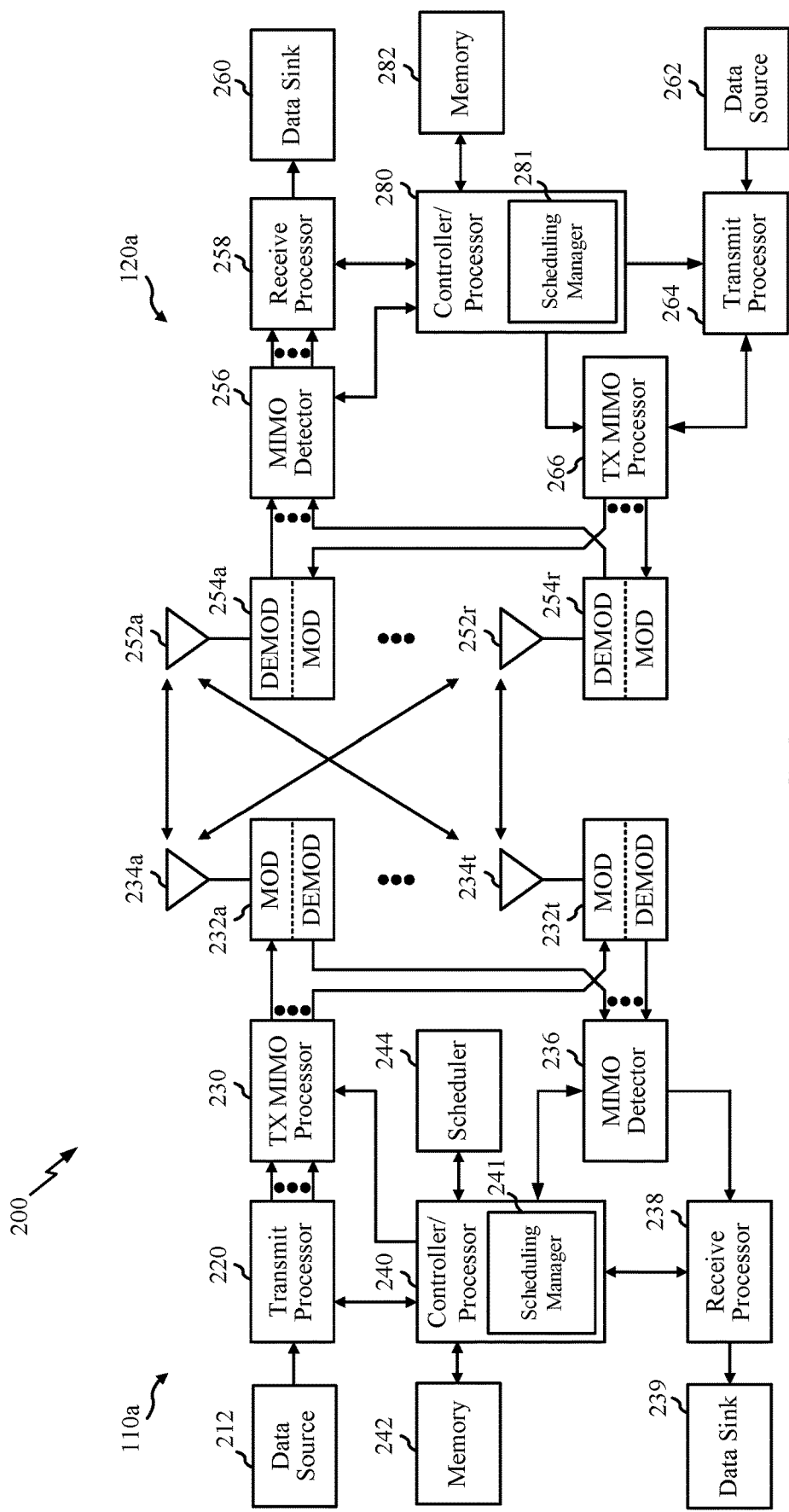
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal.

Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a scheduling manager 281 that determines when to apply an updated value of a minimum scheduling offset and/or performs various other operations for managing scheduled transmissions, according to aspects described herein. The controller/processor 240 of the BS 110a has a scheduling manager 241 that determines when to apply an updated value of a minimum scheduling offset and/or performs various other operations for managing scheduled transmissions, according to aspects described herein. Although shown at the Controller/Processor, other components of the UE 120a and BS 110a may be used to perform the operations described herein.

Figure 3:
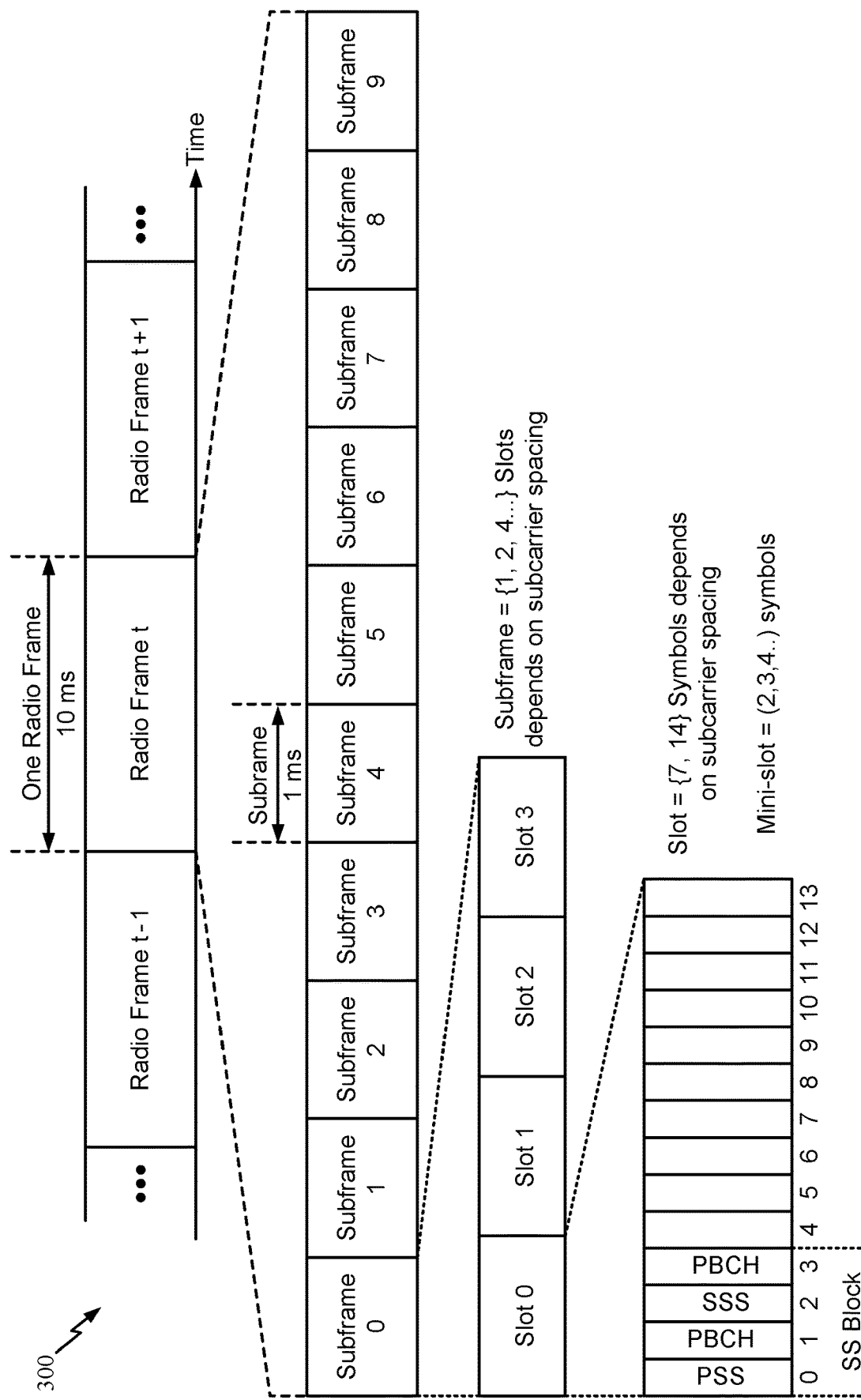
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In certain wireless communication networks (e.g. 5G NR), scheduling events (such as DL/UL resource grants or aperiodic triggers) may be supported on a cross-slot basis or an intra-slot (i.e., same-slot) basis. For example, under cross-slot scheduling, a UE may receive in a slot downlink control signaling (e.g., a downlink control information (DCI) message) that schedules the UE to receive DL transmissions in another slot. Under intra-slot scheduling, the UE may receive in a slot DCI that schedules the UE to receive DL transmissions later in the same slot. Switching from intra-slot scheduling to cross-slot scheduling may enable the UE to reduce power consumption. For instance, cross-slot scheduling may facilitates a longer micro-sleep period (e.g., when radio interfaces are temporarily disabled, but signal processing is enabled), such as when PDCCH processing is out of critical timeline. A longer scheduling offset under cross-slot scheduling may enable the UE enough time to wake up from sleep and enable radio interfaces. Scheduling events via cross-slot scheduling or intra-slot scheduling may be applicable to DL/UL resource grants (e.g., PDSCH/PUSCH) and other DCI-triggered events, such as aperiodic channel state information reference signal (A-CSI-RS) monitoring and reporting.

Figure 4A:
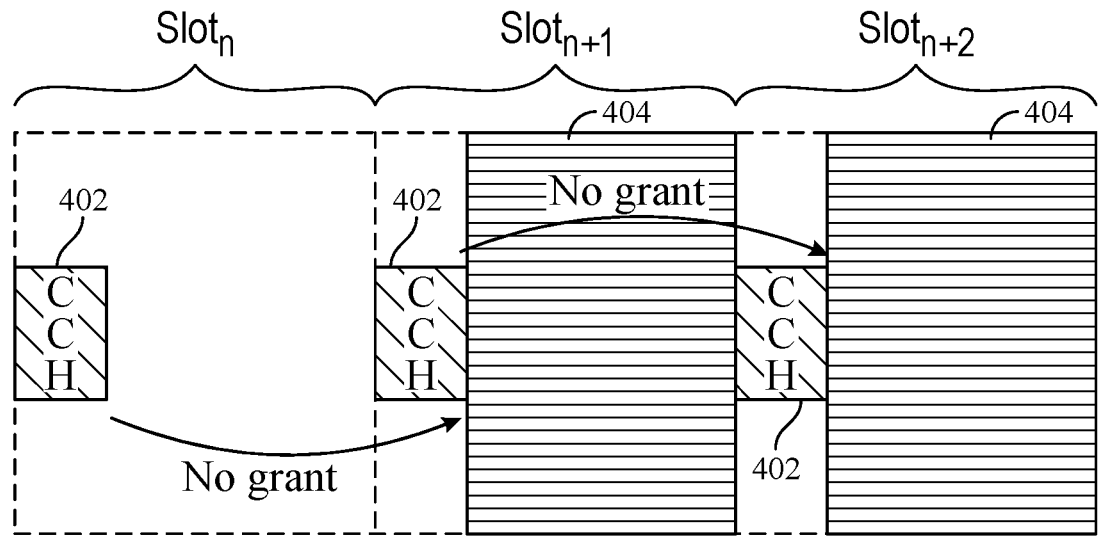
FIG. 4A illustrates example cross-slot scheduling of downlink communications, in accordance with certain aspects of the present disclosure.

FIG. 4A illustrates example cross-slot scheduling of downlink communications, in accordance with certain aspects of the present disclosure. A UE may receive DCI 402 from a BS via a control channel such as a PDCCH. The DCI 402 may be received in $slot_n$ and indicate a scheduling offset (e.g., via the parameter k0) that schedules a cross-slot DL data transmission 404 in $slot_{n+1}$. The DL scheduling offset parameter, k0, is greater than zero and provides a delay between a DL grant (DCI 402) and a corresponding DL data reception (e.g., via PDSCH). In certain cases, the delay between the control signaling (DCI 402) and the data transmission 404 may enable the UE to enter a microsleep state to reduce power consumption. In the example, in a slot (e.g. slot$_{n+1}$), the UE may not wait for PDCCH processing to finish before entering a microsleep state because the UE already knows from the PDCCH received in the previous slot (e.g. slot$_n$) whether PDSCH would be transmitted by the gNB for this slot (e.g. slot$_{n+1}$).

Figure 4B:
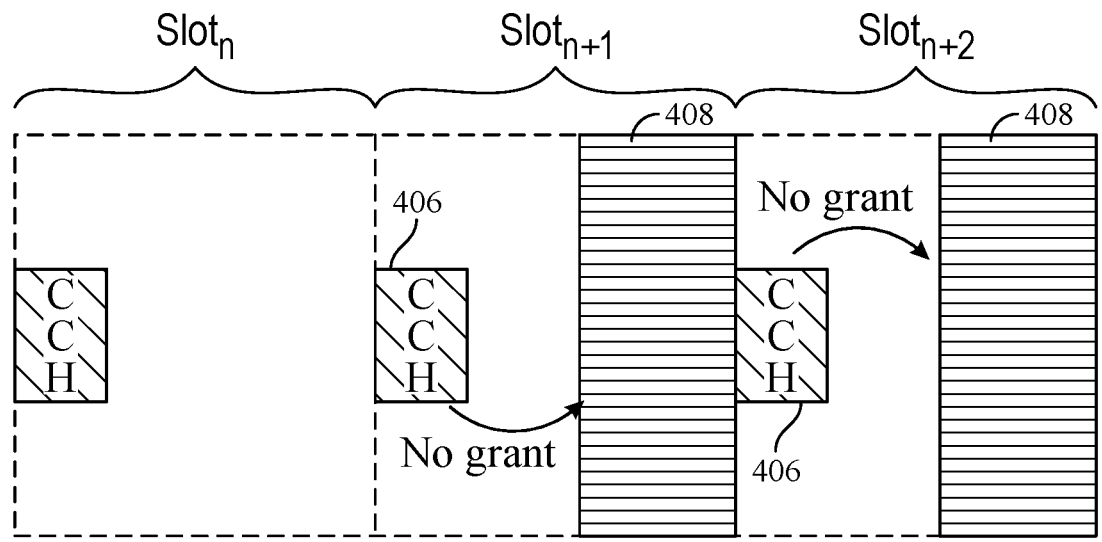
FIG. 4B illustrates example intra-slot scheduling of uplink communications, in accordance with certain aspects of the present disclosure.

FIG. 4B illustrates example intra-slot scheduling of downlink communications, in accordance with certain aspects of the present disclosure. A UE may receive DCI 406 from a BS via a control channel such as the PDCCH. The DCI 406 may be received in slot$_{n+1}$ and indicate a scheduling offset (e.g., via the parameter k0) that schedules an intra-slot UL data transmission 408 in the same slot$_{n+1}$. In this case, the DL scheduling offset parameter, k0, is zero and does not provide a delay between an DL grant (DCI 406) and a corresponding DL data transmission (e.g., via PDSCH). In order to enter a microsleep state within a slot, the UE has to wait for PDCCH processing to complete to ensure there is no PDSCH scheduled for the same slot, meanwhile still keep receiving and buffering Rx samples in case a DL scheduling DCI is decoded to indicate a PDSCH transmission by the BS in the same slot. Hence the portion of a slot that allows for microsleep is much smaller compared to the cross-slot scheduling case (e.g., FIG. 4A), which may result in less power saving. In certain cases, intra-slot scheduling may enable the UE to communicate via URLLC services because of the smaller delay between the control signaling (DCI 402) and the data transmission 404.

In certain wireless communication networks (e.g., 5G NR), bandwidth parts (BWPs) provide a flexible framework for dividing frequency-domain resources in a given carrier. With bandwidth parts, a carrier may be subdivided into different bandwidth segments. For instance, BWPs may overlap with each other or be non-contiguous (i.e., separated from each other, for example, by a guard band). The BWPs may also be used for various purposes or functions. For instance, during a period of low data activity (e.g., low throughput demands), a UE may communicate with a narrower BWP, and during a period of high data activity (e.g., high throughput demands), the UE may communicate with a wider BWP. The narrower BWP, as compared to the wider BWP, may provide a more energy efficient solution for wireless communications. That is, the UE may switch from the wider BWP to the narrower BWP to enable reduced power consumption for wireless communications. As another example, different BWPs may be used for different services or functions, such as eMBB or URLLC transmissions. In some cases, different BWPs may enable coexistence of other systems or networks.

Figure 5:
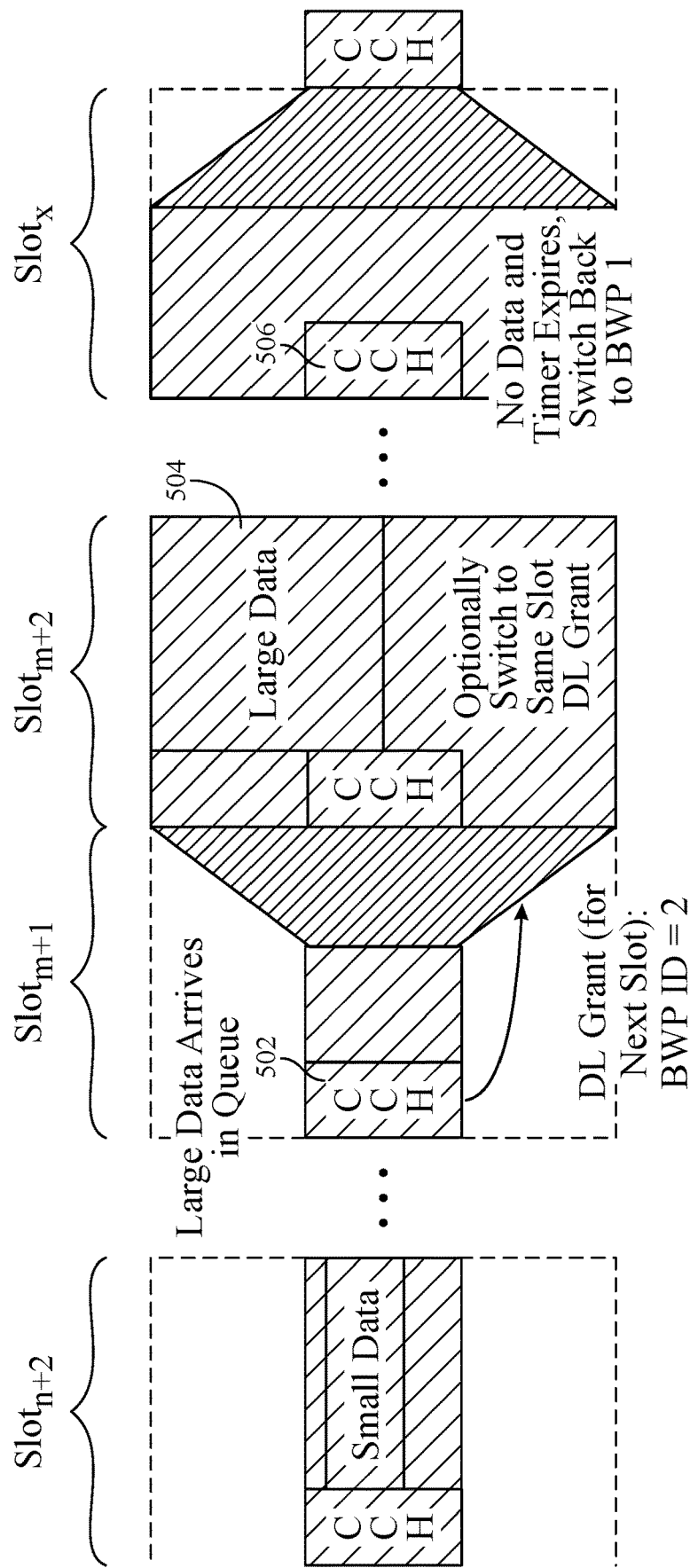
FIG. 5 illustrates example cross-bandwidth part (BWP) scheduling of downlink communications, in accordance with certain aspects of the present disclosure.

FIG. 5 illustrates example cross-BWP scheduling of downlink communications, in accordance with certain aspects of the present disclosure. A UE may receive DCI 502 from a BS via a control channel on a first BWP (e.g., a narrow BWP). The DCI 502 may be received in slot$_{m+1}$ and indicate a BWP identifier of a second BWP (e.g., a wider BWP) and a scheduling offset (e.g., via the parameter k0) that schedules a cross-slot DL data transmission 504 in a slot$_{m+2}$ of the second BWP. The BWP identifier may be a value (an integer value) used to refer to a BWP among BWPs configured on the UE. After a certain duration, the UE may receive, for example in slot$_x$, DCI 506 that indicates to switch to the first BWP (e.g., the narrow BWP).

In certain wireless communication networks (e.g. 5G NR), a minimum scheduling offset may be used to determine various actions related to downlink scheduled events such as DL/UL grants, cross-BWP scheduling, or cross-carrier scheduling. In certain aspects, the minimum scheduling offset may be the minimum applicable value for k0, k2, and A-CSI-RS triggering. In cases where k0/k2 is below the minimum scheduling offset, a UE may either invalidate the DCI based on an indicated k0/k2 or adjust the indicated k0/k2, according to the minimum scheduling offset. In other cases, when the UE receives an indication of the minimum scheduling offset of k0/k2, an entry in the active DL (UL) time-domain resource allocation (TDRA) table with k0 (k2) value smaller than the indicated minimum value may not expected by the UE.

One or more values of a minimum scheduling offset may be configured via downlink control signaling such as radio resource control (RRC) signaling and/or DCI. For example, the UE may be directly assigned a minimum scheduling offset value via DCI signaling. In other cases, the UE may receive an indication of a minimum scheduling offset value from one or multiple values preconfigured through RRC signaling. A L1-based adaptation of a minimum scheduling offset may additional to a BWP-switching based time-domain resource allocation adaptation. A non-zero A-CSI-RS triggering offset may be used for non-Type-D quasi-colocation (QCL) monitoring and reporting. A minimum A-CSI-RS triggering offset may be implicitly indicated based on the minimum value for k0. The L1-based adaptation of the minimum applicable value of k0 may not apply to SI/RA/TC/P-RNTI in Type 0/0A/1/2 common search space respectively. The L1-based adaptation of the minimum applicable value of k2 may not apply to PUSCH scheduled by a MAC RAR for contention-based and contention-free RACH or a PUSCH scheduled by TC-RNTI.

Under multi-carrier or multi-BWP configurations, the minimum scheduling offset value may be ambiguous based on differing numerologies associated with the carriers and/or BWPs. For instance, a UE configured with a minimum scheduling offset value may misinterpret the minimum scheduling offset value for cross-BWP scheduling when the target BWP has a different numerology than the active BWP on which the cross-BWP scheduling instruction was received. Suppose for example, the target BWP has a subcarrier spacing (SCS) of 30 kHz, the active BWP has a SCS of 15 kHz, and the minimum scheduling offset is defined in terms of slots. Under such a scenario, the slot duration of the active BWP is 1 ms, whereas the slot duration of the target BWP is 0.5 ms, which may lead to the UE attempting to apply a minimum scheduling offset at half the duration of what was intended. Thus, the misinterpreted minimum scheduling offset may result in missed transmissions and/or increased power consumption. In other cases, the minimum scheduling offset may be updated to handle the differing numerologies, but such a scheme would result in increased downlink signaling/overhead.

The base station and/or UE may use various frameworks for determining a minimum scheduling offset on downlink triggered events under multi-carrier and/or multi-BWP configurations. Such a scheduling framework may improve the efficiency of wireless communications including reduced power consumption and overhead signaling. As an example, the minimum scheduling offset may be given in terms a time-domain resource (e.g., a number of slots) according to a numerology of an active BWP, a reference numerology, a set of values associated with various BWPs. In other cases, the minimum scheduling offset may be set according to the units of k0 or k2. As another example, the minimum scheduling offset may be set according to an absolute time value. With cross-BWP and/or cross-carrier scheduling, the minimum scheduling offset may be defined per component carrier (CC) (e.g., common across BWPs in a given CC) or per BWP as further described herein. The UE may be configured with various values of the minimum scheduling offset via downlink control signaling, including downlink control information (DCI), a medium access control (MAC) control element (CE), or radio resource control (RRC) configuration.

In case a minimum scheduling offset is defined per CC, the minimum scheduling offset may be defined in terms of a designated numerology of a BWP (e.g. 15 kHz SCS). In aspects, the minimum scheduling offset may have values associated with each of the BWP in the CC (e.g. the minimum scheduling offset parameter, X=2 slots for 15 kHz SCS, and X=4 slots for 30 kHz SCS). In other aspects, the minimum scheduling offset may be defined in terms of an absolute time value, e.g., 2 msec. When applied to k0 or k2, the minimum scheduling offset may converted to the corresponding SCS of PDSCH or PUSCH.

In some cases, a minimum scheduling offset defined per CC may not be well suited in cases where the BWPs target different data usage scenarios, such as a narrow BWP for low data usage and low power consumption. For instance, when switching to a narrower BWP, it may be desirable to also change the minimum scheduling offset that facilitates power savings (e.g., a longer minimum scheduling offset). As another example, when switching to a wider BWP, it may be desirable to have a shorter minimum scheduling offset to facilitate lower latency communications. If the minimum scheduling offset is common across a CC, it may lead to higher signaling overhead, for example, to update the minimum scheduling offset when switching the BWP. Instead, the minimum scheduling offset may be defined per BWP to account for changes in the numerology or function of a BWP.

In certain aspects, the minimum scheduling offset may be defined per BWP according to various frameworks. For instance, when a UE is instructed to switch from an active BWP to a target BWP (e.g., triggered by cross-BWP scheduling), the minimum scheduling offset may be defined according to the numerology of the active BWP. In other cases, the minimum scheduling offset may be defined according to the numerology of the target BWP. In aspects, the minimum scheduling offset may be defined according to a maximum of a minimum value associated with the active BWP and a minimum value associated with the target BWP. In other aspects, the minimum scheduling offset may be defined according to a sum of a minimum value associated with the active BWP and a minimum value associated with the target BWP. In still other aspects, the minimum scheduling offset may be defined for cross-BWP scheduling independently.

In cases where the minimum scheduling offset is defined according to the numerology of the active BWP, the minimum scheduling offset provides the same delay as scheduling within the same BWP before the BWP switch. If the current and target BWPs have different numerologies, and if minimum scheduling offset is defined in a number of slots of the current BWP's numerology, conversion of the offset to the target BWP's numerology may be applied to cross-BWP scheduling. For instance, the minimum scheduling offset conversion may be given by the following expression:

$$X' = \left\lceil X \cdot \frac{2^{\mu_{BWP,target}}}{2^{\mu_{BWP,curr}}} \right\rceil \quad (1)$$

where X' is the converted minimum scheduling offset, X is the minimum scheduling offset being converted such as the minimum offset associated with the active BWP, $\mu_{BWP,target}$ is the numerology of the target BWP, $\mu_{BWP,curr}$ is the numerology of the active BWP.

In aspects, the DL/UL grant parameters (k0, k2) may be checked according to the following expression:

$$\{k0|k2\} \geq X' \text{ or } X \quad (2)$$

where X' is the converted minimum scheduling offset for cross-BWP scheduling triggering BWP switch between BWP with different numerologies. For intra-BWP scheduling, X is the minimum scheduling offset in terms of the active BWP.

Figure 6:
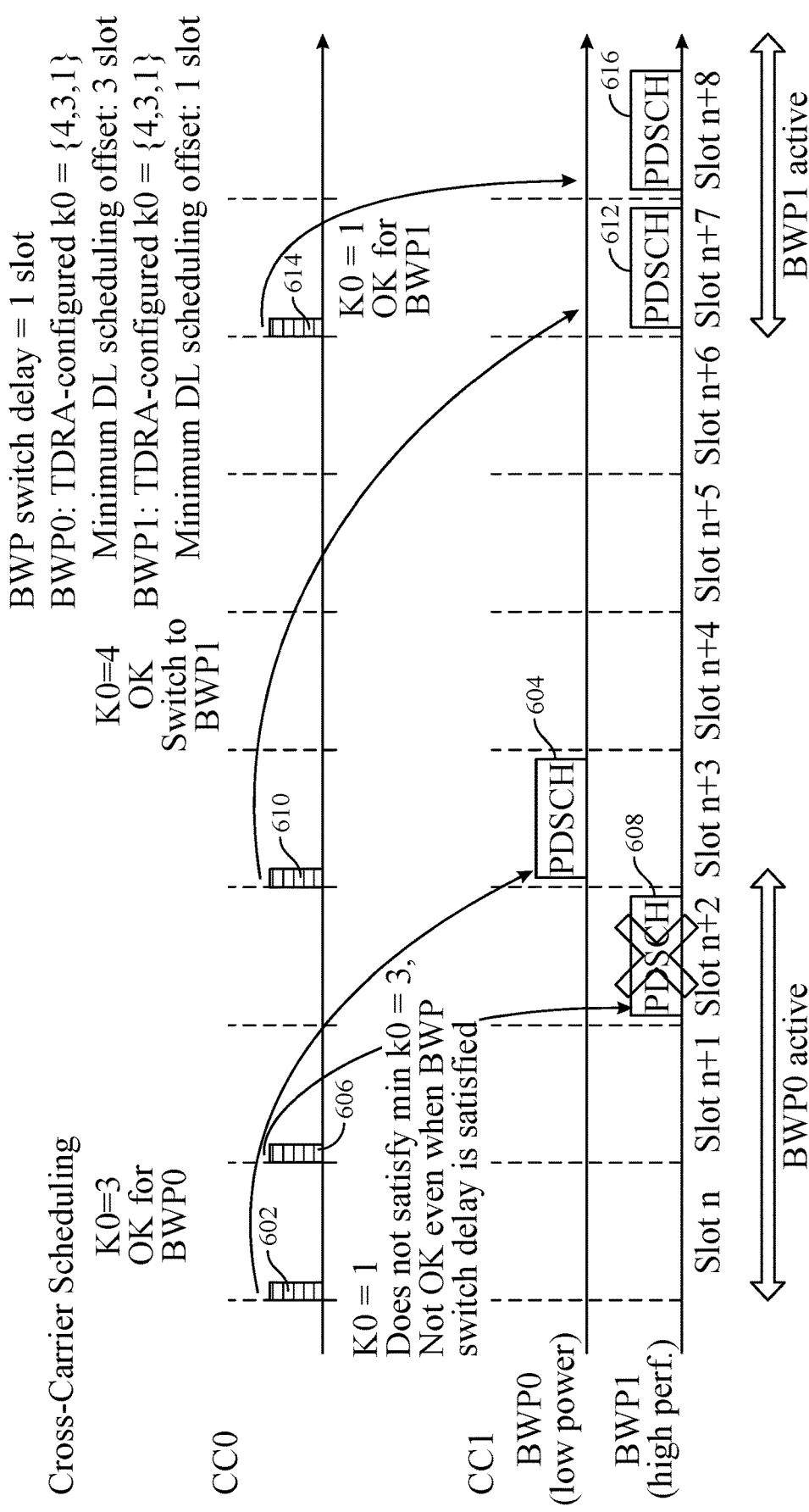
FIG. 6 illustrates example cross-carrier scheduling of downlink communications, in accordance with certain aspects of the present disclosure.

In certain cases, the UE may receive cross-carrier scheduling on component carrier that schedules transmission on another component carrier. For example, FIG. 6 illustrates example cross-carrier scheduling of downlink communications. Suppose the BWPs have the same numerology, a BWP switch delay is configured as 1 slot, the minimum scheduling offset (X) associated with BWP0 on CC1 is set as 3 slots, the minimum scheduling offset (X) associated with BWP1 on CC1 is set as 1 slot, and BWP0 and BWP1 may each have various values of k0 configured. As shown, a UE may receive DCI 602 from a BS via a control channel (such as a PDCCH) on CC0. The DCI 602 may be received in $slot_n$ and indicate a scheduling offset (e.g., k0=3) that schedules a cross-carrier DL data transmission 604 in $slot_{n+3}$ on BWP0 of CC1.

While the minimum scheduling offset value for BWP0 (min k0=3) is active based on the reception of DCI 602, if the UE receives DCI 606 from the BS on CC0 in $slot_{n+1}$, and the DCI 606 indicates a scheduling offset of k0=1 scheduling a cross-carrier DL data transmission 608 in $slot_{n+2}$ on BWP1 of CC1, this does not satisfy the minimum scheduling offset of 3 slots for the active BWP, and the UE may take various actions, such as regarding the DCI as invalid (e.g., ignoring the scheduling grant) or applying a default scheduling offset value, as further described herein.

As another example, the UE receives DCI 610 from the BS on CC0 in $slot_{n+3}$, and the DCI 610 indicates scheduling offset of k0=4 that schedules a cross-carrier DL data transmission 612 in $slot_{n+7}$ on BWP1 of CC1, which sets the minimum scheduling offset value (min k0=1) for BWP1 as the current value. While the minimum scheduling offset value for BWP1 (min k0=1) is active based on the reception of DCI 610, the UE receives DCI 614 from the BS on CC0 in $slot_{n+7}$, and the DCI 614 indicates a scheduling offset of k0=1 scheduling a cross-carrier DL data transmission 616 in $slot_{n+8}$ on BWP1 of CC1. The DL scheduling of DCI 614 satisfies currently active minimum scheduling offset value of BWP1.

Example Scheduling Application Delay

Figure 7:
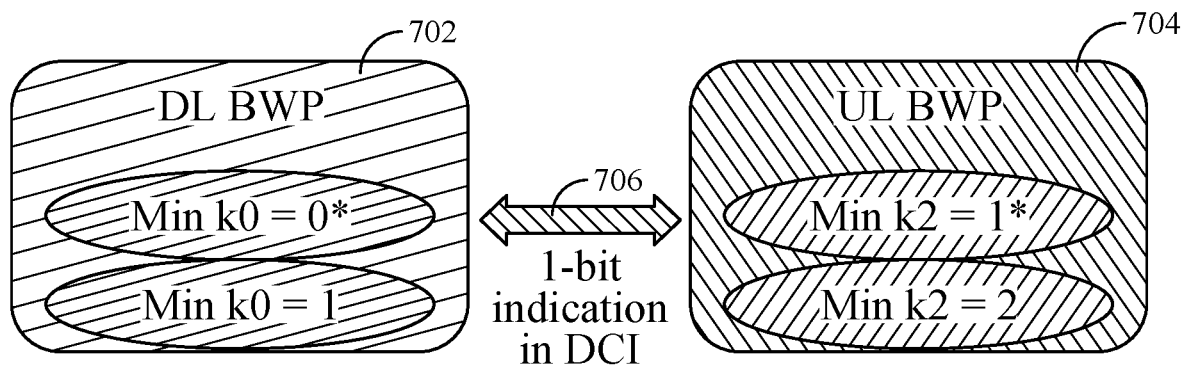
FIG. 7 illustrates an example diagram of minimum scheduling offset values per BWP, in accordance with certain aspects of the present disclosure.

In certain wireless communication systems (e.g., 5G NR), to adapt the minimum applicable value of k0 (k2) for an active DL (UL) BWP for the carrier where PDSCH (PUSCH) is transmitted, a UE may be configured with a plurality of minimum scheduling offset values (e.g., up to two RRC-configured values for DL and UL grants). FIG. 7 illustrates an example diagram of minimum scheduling offset values per BWP, in accordance with certain aspects of the present disclosure. Referring to FIG. 7, a UE may be configured with two minimum scheduling offset values (min k0=0 or 1) for a DL BWP 702 and two minimum scheduling offset values (e.g., min k2=1 and 2) for a UL BWP 704. In this example, control signaling (e.g., DCI) may have a 1-bit indication 706 that selects which value of the minimum scheduling offset values for the UE to use for communications.

In some cases, a configuration having only one minimum scheduling offset value may be treated as configuring one of two values, where the other value is treated as a default value. An RRC configuration of the minimum scheduling offset values may be per BWP. The minimum scheduling offset values may be based on the numerology of the BWP associated with the RRC configuration. If there are multiple RRC configured minimum scheduling offset values for a BWP, a bit flag (e.g., a 1-bit indication) may activate one value from the multiple candidate values. The bit flag in DCI format 1_1 or format 0_1 may be used to jointly select the minimum applicable k0 for the active DL BWP and the minimum applicable k2 value for the active UL BWP, which are to be applied at least after the application delay.

When a BWP is activated without a selection of the minimum scheduling offset value, until the 1-bit indication is received, a default value may be used as the current minimum scheduling offset value. For an activated BWP without the 1-bit indication received in DCI for adapting the minimum applicable value of k0 (k2) for the BWP when there are one or two RRC configured values for the BWP (e.g., due to BWP switching triggered by BWP timer expiration, etc.), the value applied for the BWP may be determined by selecting any suitable value if there is only one RRC configured value or selecting the lowest-indexed RRC configured value if there are multiple RRC configured values. In other cases, when a BWP is activated without a selection of the minimum scheduling offset value, the value applied for the BWP may be determined by selecting the configured value if one value is RRC configured or selecting the lowest-indexed RRC configured value if multiple values are RRC configured. In still other cases, when a BWP is activated without a selection of the minimum scheduling offset value, the value applied for the BWP may be determined by selecting any suitable value. While the examples provided herein are described with respect to a 1-bit indication flag that selects one of two minimum scheduling offset values to facilitate understanding, aspects of the present disclosure may also be applied to a bitmap or index that selects one of multiple minimum scheduling offset values.

In certain wireless communication systems (e.g., 5G NR), the UE may determine when to apply an updated value of the minimum scheduling offset as described herein. As an example, if the bit flag in the DCI indicates a change in the minimum scheduling offset value, the UE may apply the change after expiration of a certain application delay. For example, for an active DL BWP and active UL BWP, when a UE is indicated by L1-based signaling(s) in slot n to change the minimum scheduling offset value of k0 and/or k2, the UE may not be expected to apply the new minimum scheduling offset value before slot values given by the following expressions:

$$k0: \left\lceil (n+X) \cdot \frac{2^{\mu_{PDSCH}}}{2^{\mu_{PDCCH}}} \right\rceil \quad (3)$$

$$k2: \left\lceil (n+X) \cdot \frac{2^{\mu_{PUSCH}}}{2^{\mu_{PDCCH}}} \right\rceil \quad (4)$$

where X=max (Y, Z) may be in the numerology of the scheduling PDCCH, Y is the minimum scheduling offset value of k0 (or k2) prior to the indicated change in the numerology of the scheduled transmissions (which may be converted with the conversion factor $$\frac{2^{\mu_{PDCCH}}}{2^{\mu_{P(D|U)SCH}}}$$

and quantized to the next PDCCH slot), Z is the smallest feasible non-zero application delay (e.g. 1). In another example, X=Y+Z is another way to ensure that X is at least as large as the smallest feasible non-zero application delay. In certain cases, such a mechanism to determine when the new minimum scheduling offset is applied may not be suitable for certain scheduling situations (e.g., cross-carrier scheduling) or may result in inefficiencies such as increased latency or inefficient power consumption.

In certain cases, the minimum scheduling offset of k0 (or k2), which determines the value of Y, may not be configured for the active DL (or UL) BWP, and the application delay may be based on various default values for the minimum scheduling offset. In an example, a fixed value (e.g. zero) may be assumed to be the value of Y. In another example, the smallest k0 (or k2) configured in the TDRA table for the active DL (or UL) BWP may be assumed to be the value of Y. In certain cases, the UE may expect a configuration for the minimum scheduling offset of k0 (or k2), and the application delay may be determined without default values for the minimum scheduling offset.

Certain aspects of the present disclosure provide an enhancement to improve the framework to update the minimum scheduling offset according to an application delay of when to apply the updated minimum scheduling offset. Generally speaking, the effective start time of the updated minimum value may not be earlier than a current minimum value. Considering that cross-BWP scheduling may trigger BWP switch with different numerologies, instead of defining the starting slot for applying the updated minimum value with respect to the scheduling PDCCH's numerology, it would be more universal to define the application delay in terms of the earliest slot for which a transmission can be scheduled by applying the updated minimum value. With this definition, the earliest slot, defined in the numerology of k0 (or k2), that can be scheduled with k0 (or k2) satisfying the updated minimum value, can be expressed as:

$$k0: \left\lceil (n+X) \cdot \frac{2^{\mu_{BWP,target}}}{2^{\mu_{BWP,curr}}} \right\rceil \quad (5)$$

$$k2: \left\lceil (n+X) \cdot \frac{2^{\mu_{BWP,target}}}{2^{\mu_{BWP,curr}}} \right\rceil \quad (6)$$

where $\mu_{BWP,target}$ is the numerology of the target BWP (e.g., the scheduled PDSCH or PUSCH) and $\mu_{BWP,curr}$ is the numerology of the active BWP before the BWP switch (e.g., for a DL BWP, the PDCCH on which the control signaling was received). Note that one difference compared to Equations (3) and (4) is that n is defined in the slot unit of the k0 or k2 (i.e. the scheduled PDSCH/PUSCH), not in the slot unit of the PDCCH. Similar to Equations (3) and (4), X=max (Y, Z), Y may be the minimum scheduling offset value of k0 (or k2) prior to the indicated change, Z may be the smallest feasible non-zero application delay (e.g. 1). In certain aspects, Y with respect to Equations (3) and (4) may be the minimum value from the minimum scheduling offset value of k0 and minimum scheduling offset value of k2. In other aspects, the application delay may be determined based on an absolute time value, a number of time-domain resources (e.g., slots), or a BWP switch delay value. In still other aspects, if the scheduled transmission is for a PDSCH (e.g., a DCI format 1_1 (DL-scheduling DCI) is received on the PDCCH), Y with respect to Equations (3) and (4) may be the minimum value from the minimum scheduling offset values for k0, and if the scheduled transmission is for a PUSCH (e.g., a DCI format 0_1 (UL-scheduling DCI) is received on the PDCCH), Y with respect to Equations (3) and (4) may be the minimum value from the minimum scheduling offset values for k2.

As the application delay may be derived according to the Equations (3) and (4) with the minimum scheduling offset values in terms of a time-domain resource (e.g., a number of slots) according to a numerology of a certain BWP (e.g., the numerology of the BWP for which the minimum scheduling offset was configured), there may be ambiguities based on differing numerologies associated with the carriers and/or BWPs, especially in cross-carrier scheduling scenarios. Suppose for example, the target BWP has a subcarrier spacing (SCS) of 30 kHz, the active BWP has a SCS of 15 kHz, and the minimum scheduling offset is defined in terms of slots. Under such a scenario, the slot duration of the active BWP is 1 ms, whereas the slot duration of the target BWP is 0.5 ms, which may lead to the UE attempting to apply a minimum scheduling offset an/or an application delay at half the duration of what was intended. Thus, the misinterpreted minimum scheduling offset and/or application delay may result in missed transmissions and/or increased power consumption. In other cases, the minimum scheduling offset and/or application delay may be updated to handle the differing numerologies between the active BWP and target BWP, but such a scheme may result in increased downlink signaling/overhead.

Aspects of the present disclosure generally relate to a framework for determining when to apply an updated value of a minimum scheduling offset. Such a scheduling framework may improve the efficiency of wireless communications including reduced power consumption and/or reduced signaling overhead. In certain aspects, the application delay for cross-carrier scheduling may be defined according to the numerology of the scheduling CC, or the numerology of the active BWP or the target BWP of the scheduled CC. In other aspects, the application delay for self-carrier scheduling may be defined according to the numerology of the active BWP or the target BWP.

In certain aspects, the application delay for cross-carrier scheduling may be defined according to the numerology of the active BWP of the scheduling CC (i.e. the numerology of the scheduling PDCCH). As an interim application delay value may be in terms of the numerology of the scheduled CC (e.g., the numerology of the scheduled PDSCH or PUSCH), the application delay may be converted to the numerology of the scheduling CC according to the following expression:

$$\text{application\_delay} = \left\lceil X \cdot \frac{2^{\mu_{PDCCH}}}{2^{\mu_{P\{D|U\}SCH}}} \right\rceil \quad (7)$$

where X may be an interim value of the application delay based on at least one of the minimum scheduling offset values, for example, as described herein with respect to Equations (3) and (4).

Suppose a current value of the application delay is X=3, the PDSCH has a SCS of 120 kHz on the scheduled CC, and the PDCCH has a SCS of 30 kHz on the scheduling CC. Under such an example, Equation (7) provides an application delay of %, which may be rounded up to 1. In this case, the updated scheduling offset is applied in the next slot of the scheduling CC from when the PDCCH is received.

In certain aspects, the application delay for cross-carrier scheduling may be defined according to the numerology of the target BWP of the scheduled CC. This technique avoids the conversion step to the numerology of the scheduling CC. In other words, the application delay may remain in the numerology domain of the scheduled CC.

Figure 8:
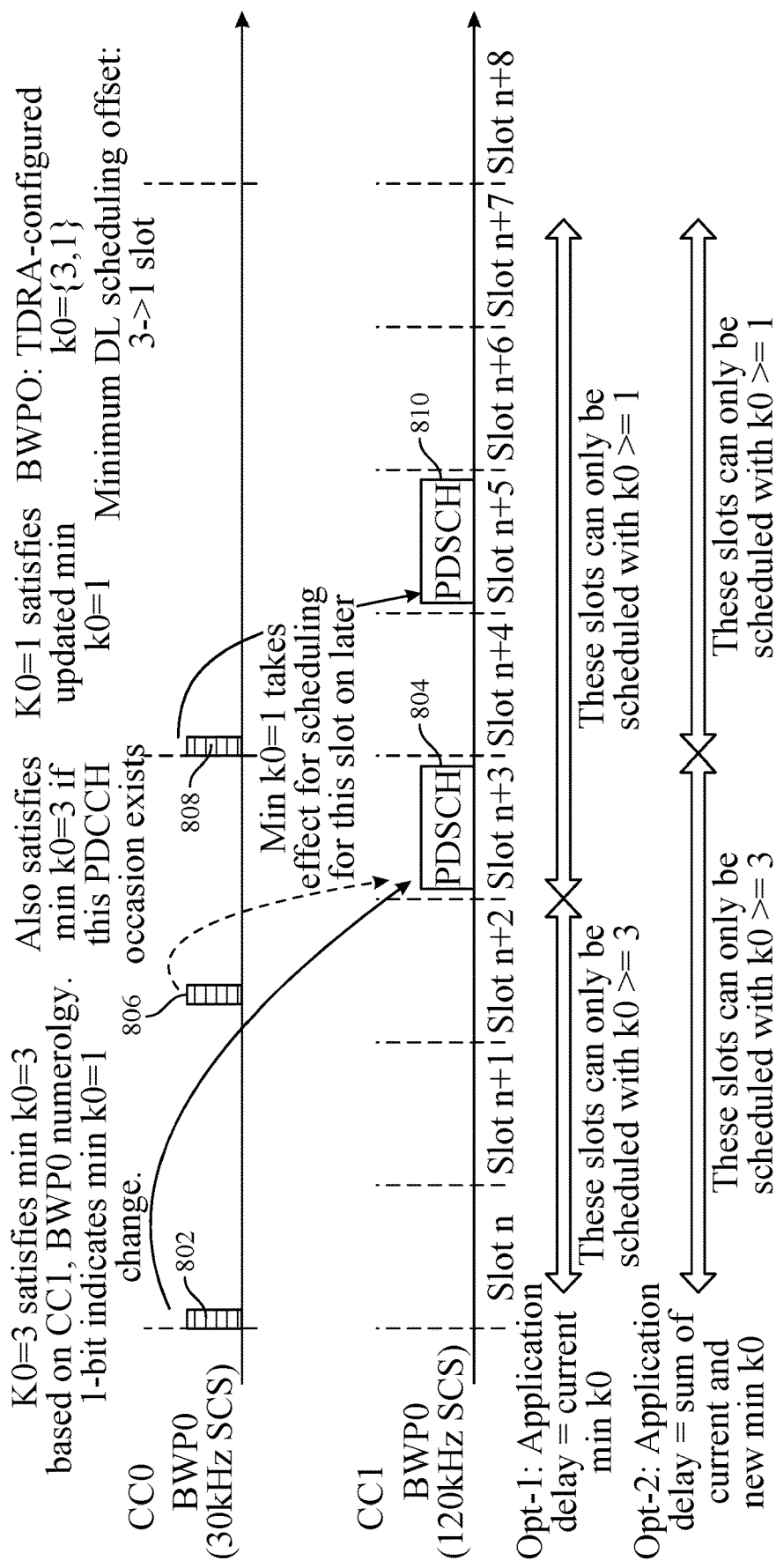
FIG. 8 illustrates example cross-carrier scheduling of downlink communications where the application delay is defined according to the numerology of a target BWP, according to certain aspects of the present disclosure.

FIG. 8 illustrates example cross-carrier scheduling of downlink communications where the application delay is defined according to the numerology of the target BWP of the scheduled CC, according to certain aspects of the present disclosure. Suppose BWP0 of CC0 has a numerology associated with a 30 kHz SCS, the BWP0 of CC1 has a numerology associated with a 120 kHz SCS, the current minimum scheduling offset (X) associated with BWP0 on CC1 is set as 3 slots. As shown, a UE may receive DCI 802 from a BS via a control channel (such as a PDCCH) on CC0, coinciding with slot$_n$ of CC1. The DCI 802 indicates an updated value for the minimum scheduling offset (e.g., min k0=1). As an example, the DCI 802 may also schedule a cross-carrier DL data transmission 804 on BWP0 of CC1 at slot$_{n+3}$ according to the scheduling offset of 3 slots. As another example, the UE may also receive DCI 806 from the BS on CC0 in slot$_{n+2}$ of CC1, where the DCI 806 provides cross-carrier scheduling for the DL data transmission 804.

The UE may apply the application delay to the numerology of the target BWP of the scheduled CC, where in this example, a value of the application delay may be the current minimum scheduling offset value (e.g., 3 slots). As such, based on the numerology of the target BWP (e.g., BWP0 on CC1), slot$_n$ through slot$_{n+2}$ may be scheduled with a scheduling offset greater than or equal to the current minimum scheduling offset, and the following slots may be scheduled with a scheduling offset greater than or equal to the updated value of the minimum scheduling offset.

In other aspects, the value of the application delay may be based on the current minimum scheduling offset and an adjustment term. For example, the value of the application may be the sum of the current minimum scheduling offset and the adjustment term, which, in certain aspects, may be the updated value of the minimum scheduling offset. Referring to FIG. 8, the current minimum scheduling offset may be used from slot$_n$ through slot$_{n+3}$, and during the following slots the updated value of the minimum scheduling offset will be used.

For the slots on CC1 that can be scheduled by applying the updated value of the minimum scheduling offset (e.g., min k0=1), the UE may receive DCI 808 from the BS on CC0, where the DCI 808 schedules a cross-carrier DL data transmission 810 on CC1 at slot$_{n+5}$ (e.g., the DCI 808 indicates k0=1). According to the numerology of the CC1, the UE applies the updated minimum scheduling offset value to determine various actions for the data transmission 810 (e.g., ignoring the scheduled grant if the corresponding grant parameter (k0 or k2) is less than or equal to the updated minimum scheduling offset value).

In certain aspects, the application delay for self-carrier (i.e., intra-carrier) scheduling may be defined according to the numerology of the active BWP. In other words, the slot definition for the application delay may be defined per the scheduling PDCCH. As an interim application delay value may be in terms of the numerology of the scheduled CC, the application delay may be converted to the numerology of the scheduling CC according to Equation (7).

Figure 9A:
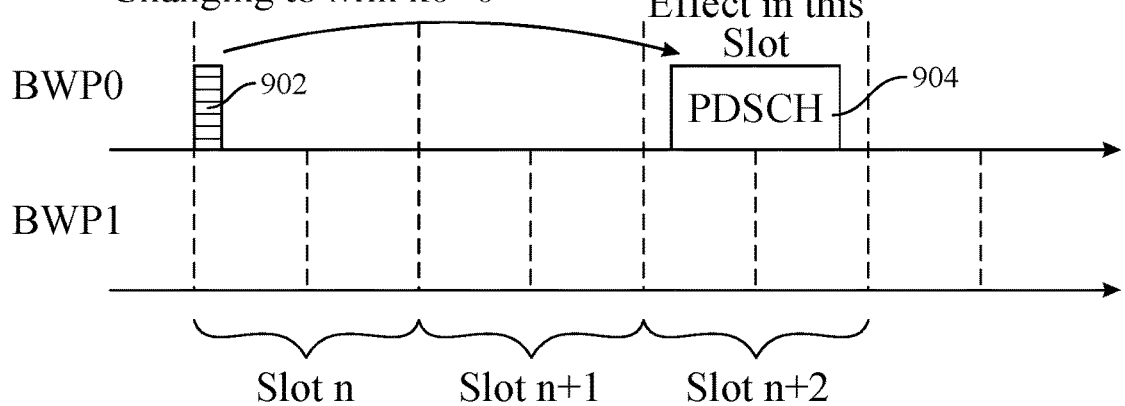
FIG. 9A illustrates example self-carrier scheduling of downlink communications where the application delay is defined according to the numerology of the active BWP, according to certain aspects of the present disclosure.

FIG. 9A illustrates example self-carrier scheduling of downlink communications where the application delay is defined according to the numerology of the active BWP, according to certain aspects of the present disclosure. Suppose a BWP switch delay is configured as 1 slot at 15 kHz SCS and 2 slots at 30 kHz SCS, the minimum scheduling offset (X) associated with BWP0 (15 kHz SCS) is set as 2 slots, the minimum scheduling offset (X) associated with BWP1 (30 kHz SCS) is set as 0 slots, and BWP0 and BWP1 may each have various values of k0 configured. As shown, a UE may receive DCI 902 from a BS via a control channel such as a PDCCH. The DCI 902 may be received in slot$_n$ and indicate a scheduling offset (e.g., k0=2) that schedules an intra-BWP DL data transmission 904 in slot$_{n+2}$. In addition, the DCI 902 indicates an updated value for the minimum scheduling offset changing value to zero. In certain aspects, the application delay may be based on the current minimum scheduling offset of 2 slots. Under the numerology of the active BWP, the UE may allow the expiration of the application delay of 2 slots in terms of the numerology of the active BWP at slot$_{n+2}$, where the updated value of the minimum scheduling offset may take effect.

Figure 9B:
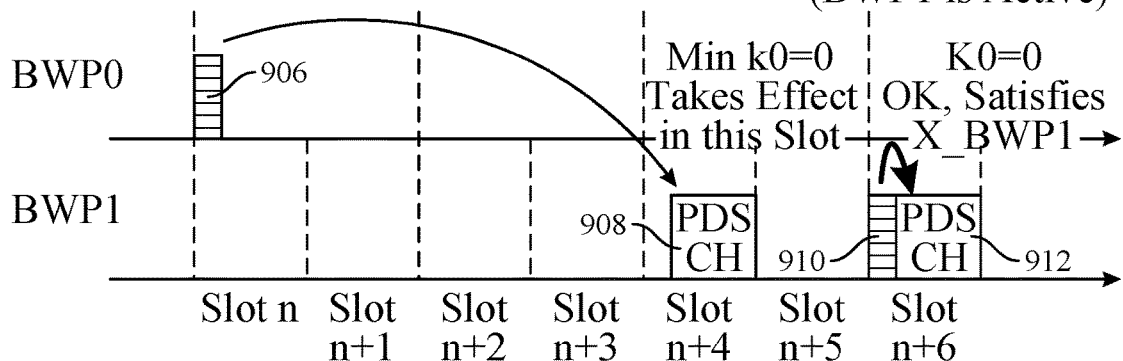
FIG. 9B illustrates example self-carrier scheduling of downlink communications where the application delay is defined according to the numerology of the target BWP, according to certain aspects of the present disclosure.

In certain aspects, the application delay for self-carrier (i.e., intra-carrier) scheduling may be defined according to the numerology of the target BWP. FIG. 9B illustrates example self-carrier scheduling of downlink communications where the application delay is defined according to the numerology of the target BWP, according to certain aspects of the present disclosure. Suppose the same assumptions apply in this example as described herein with respect to FIG. 9A. As shown, a UE may receive DCI 906 from a BS via a control channel such as a PDCCH. The DCI 906 indicates a scheduling offset (e.g., k0=4) that schedules a cross-BWP DL data transmission 908 in slot$_{n+4}$ of BWP1. In addition, the DCI 906 indicates an updated value for the minimum scheduling offset changing value to zero. In certain aspects, the application delay may be based on the current minimum scheduling offset of 2 slots. Under the numerology of the target BWP, the UE may allow the expiration of the application delay of 2 slots, which may be set in terms of the numerology of the active BWP, converted to the target BWP, which provides a 4 slot application delay according to Equations (5) or (6). Slot$_{n+4}$ of BWP1 may be scheduled by applying the updated minimum scheduling offset, for example. The UE may receive DCI 910 at slot$_{n+6}$, where the DCI 910 schedules an intra-slot DL data transmission 912, which satisfies the updated value of the minimum scheduling offset.

For cross-carrier scheduling with the same numerology between the scheduling carrier and scheduled carrier, the slots for the scheduling carrier and the scheduled carrier are aligned. The numerology of the scheduled carrier may change if its active BWP is switched between two BWP with different numerologies. Besides DCI on the scheduling carrier, there may be no difference from self-carrier scheduling.

Figure 10A:
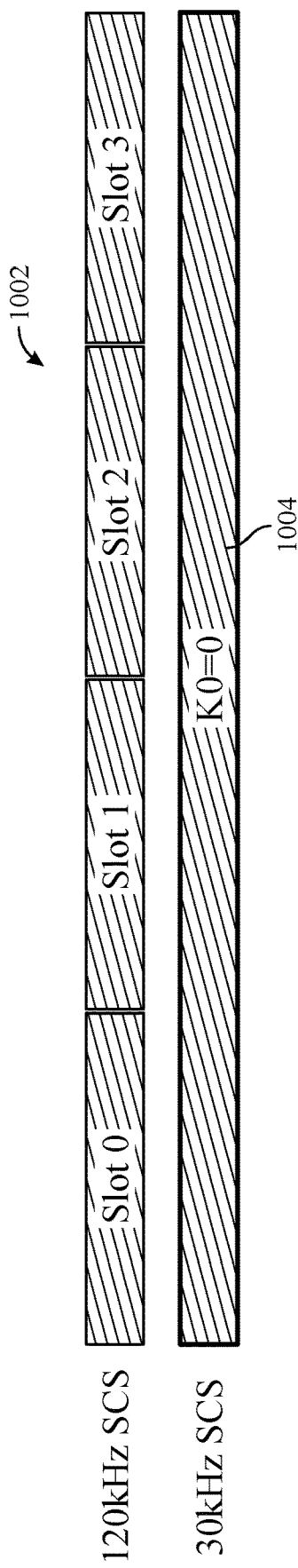
FIG. 10A illustrates a diagram of multiples slots of a scheduling carrier overlapping with a single slot of a scheduled carrier, in accordance with certain aspects of the present disclosure.

For cross-carrier scheduling with different numerologies between the scheduling carrier and scheduled carrier, there are issues with how to define minimum scheduling offsets for k0 and k2 and how to define application delay for minimum scheduling offset change. In certain wireless communication networks (e.g. 5G NR), the current definition for k0 and k2 is that, when k0=0 and k2=0, the slot on the scheduled carrier starts aligned to the slot of the scheduling carrier for purposes of determining the slots of the scheduling offset. For the case of a carrier with a larger SCS (e.g., 120 kHz SCS) scheduling a carrier with a smaller SCS (e.g., 30 kHz SCS), multiple slots of the scheduling carrier overlaps with one slot of the scheduled carrier. For example, FIG. 10A illustrates a diagram of multiples slots of a scheduling carrier 1002 overlapping with a single slot of a scheduled carrier 1004. In this example, a DCI with a scheduling offset of k0=0 received in any of the slots (slot 0-3) of the scheduling carrier 1002 may schedule a transmission within the slot of the scheduled carrier 1004.

Figure 10B:
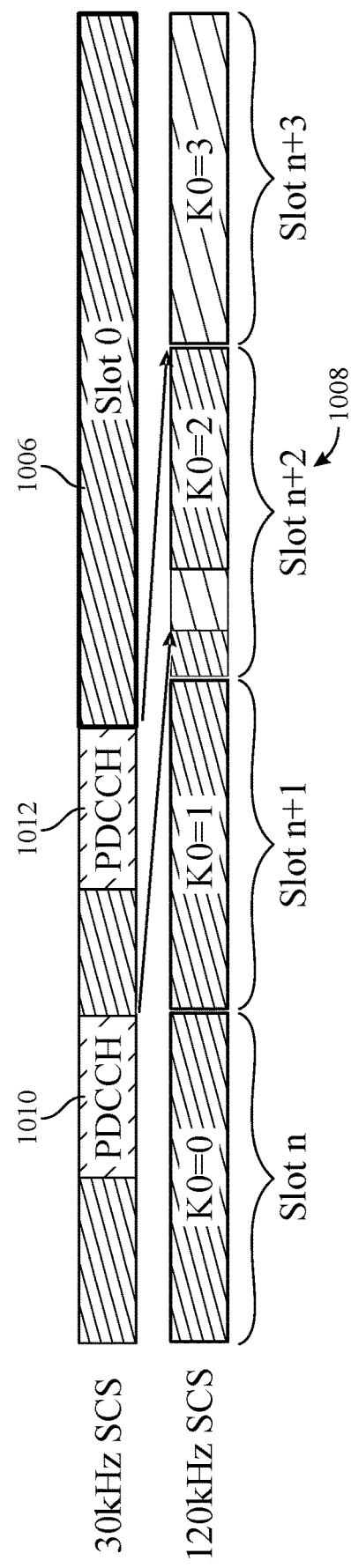
FIG. 10B illustrates a diagram of a single slot of a scheduling carrier overlapping with a multiple slots of a scheduled carrier, in accordance with certain aspects of the present disclosure.

For the case of a carrier with a smaller SCS scheduling a transmission on a carrier with a larger SCS, one slot of the scheduling carrier overlaps with multiple slots of the scheduled carrier. For example, FIG. 10B illustrates a diagram of a single slot of a scheduling carrier 1006 overlapping with a multiple slots of a scheduled carrier 1008. In some cases with the k0/k2 definition aligned to the start of slot of the scheduled carrier, if the PDCCH is received in a later part of the slot (e.g., coinciding with the timing of slot$_{n+1}$ of the scheduled carrier 1008), the scheduling offset would have to be larger than zero (e.g., k0=3) to satisfy a minimum scheduling offset due to k0=0 is already at slot$_n$ of the scheduling carrier 1008. Thus, in some cases, a single minimum k0 configured for the scheduled CC may not be efficient as the minimum scheduling offset may be over-provisioned (e.g., too long, which increases the latency) for a PDCCH received earlier in the slot of the scheduling CC (e.g., at slot$_n$ of the scheduled carrier 1008). Referring to FIG. 10B, the PDSCH/PUSCH may not be scheduled within 2 slots after the scheduling PDCCH. To achieve this, for the latter PDCCH 1012, k0 has to be 3 slots or larger. In other cases, for the earlier PDCCH 1010, k0 can be 2 or larger. So overall, a single "minimum k0" that works across all PDCCH positions is 3 slots. However, this minimum scheduling offset may be over-provisioned for certain cases, resulting in increased power consumption and/or increased signaling to manage minimum scheduling offset values.

Aspects of the present disclosure relate to various techniques for determining the scheduling offset in cases where the SCS are different between the scheduling carrier and scheduled carrier. Such techniques described herein may improve the power consumption of the UE and/or reduce the signaling overhead in managing minimum scheduling offset values to accommodate the different SCSs. In certain aspects, the PDCCH may only be received in the first half of a slot of the scheduling carrier (e.g., only within the first three symbols of the slot of the scheduling carrier). In other aspects, the starting position from when the minimum scheduling offset runs may be relative to the slot of the scheduled carrier that intersects with the last symbol of the PDCCH on the scheduling carrier. For example, referring to FIG. 10B, the minimum scheduling offset may run from slot$_{n+1}$ of the scheduled carrier 1008 due to the reception of the PDCCH 1012 at slot$_{n+1}$.

As another example, if the ending position of PDCCH 1010 is in slot$_n$ of the scheduled carrier 1008, and a minimum DL scheduling offset is 2 slots (in PDSCH SCS), the earliest schedulable PDSCH may start in slot$_{n+2}$ or later. Thus, the minimum scheduling offset may be at least 1 slot.

In still other aspects, the minimum scheduling offset may be defined in terms of symbols of the scheduled carrier from the last symbol of the scheduling PDCCH. For example, the minimum scheduling offset and scheduling offset k0/k2 may be given as a number of symbols from the last symbol of the PDCCH 1012.

The UE may take various actions if the scheduling offset is less than or equal to the minimum scheduling offset value.

In certain aspects, if the k0 (or k2) indicated in the TDRA field in DCI format 1_0 (or 0_0) is less than or equal to the current minimum scheduling offset value currently in use, the UE may implicitly switch to a default value for the minimum scheduling offset (e.g., the value corresponding to '0' as the 1-bit indication).

In certain aspects, the base station may implement various techniques for error handling if the base station detects that the UE has not applied the updated minimum scheduling offset according to the application delay as described herein. For instance, the base station may retransmit the updated value of the minimum scheduling offset if the base station determines that the UE has not properly implemented the updated value.

According to certain aspects, there may be an upper bound for minimum scheduling offset values. For instance, the minimum k0/k2 may provide enough delay for the modem to warm-up (e.g. using this for cross-carrier wake-up), 3 milliseconds may be sufficient, which may be about 24 slots at a 120 kHz SCS. That is, the upper bound for the minimum scheduling offset values may be 24 slots. In other aspects, the minimum scheduling offset value may be greater than 1 slot without an upper bound.

Figure 11:
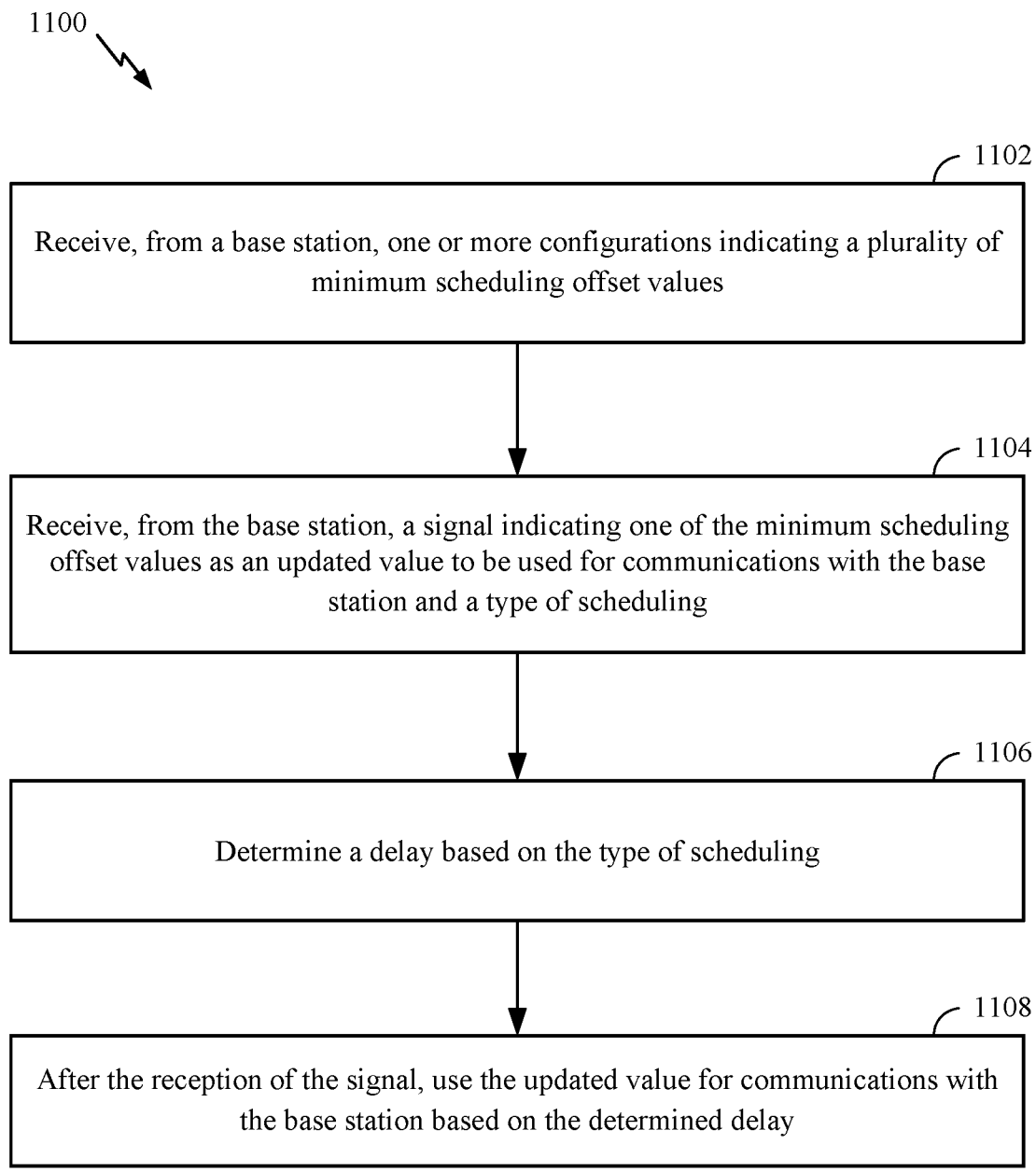
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by UE (e.g., the UE 120a in the wireless communication network 100). Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1102, where a UE may receive, from a base station (e.g., the BS 110a), one or more configurations (e.g., an RRC configuration) indicating a plurality of minimum scheduling offset values (for example, as described herein with respect to FIG. 7). At 1104, the UE may receive, from the base station, a signal (e.g., control signaling including RRC, DCI, and/or MAC-CE signaling) indicating one of the minimum scheduling offset values as an updated value to be used for communications with the base station and a type of scheduling (e.g., cross-carrier scheduling or self-carrier scheduling). At 1106, the UE may determine a delay (e.g., the application delay determined according to Equations (5), (6), or (7)) based on the type of scheduling. At 1108, the UE may use the updated value for communications with the base station based on the determined time delay, after the reception of the signal.

At 1108, using the updated value for communications with the base station may include the UE communicating with the base station based on the updated value, for example, determining whether scheduling offsets (k0 or k2) satisfy the updated value according to Equation (2). As used herein, communicating with the base station may include, for example, the UE receiving DL data transmissions from the base station. In other cases, the UE may transmit UL data transmissions to the base station. In aspects, the updated value may be used for communications with the base station after the reception of the signal and expiration of a delay (e.g., the application delay) as described herein. As an example, the time-domain resource may include a time-domain resource (e.g., a slot according to the numerology of the PDCCH or the PDSCH/PUSCH) offset from the last time domain resource of the signal by the delay, which may be determined as described herein.

In certain aspects, the application delay for cross-carrier scheduling may be defined according to the numerology of the active BWP. As an example, with respect to operations 1100, the type of scheduling indicated in the signal may be cross-carrier scheduling such that the signal is received via a first BWP (e.g., a DL BWP on a PDCCH) within a first carrier (e.g., a component carrier), and the signal further indicates a scheduling offset to be used for communications with the base station via a second BWP (e.g., a DL or UL BWP on a PDSCH or PUSCH) with a second carrier that is different from the first carrier. At 1106, the delay (e.g., the application delay) may be determined in terms of time-domain units (e.g., symbols, slots, frames, etc.) associated with the first BWP, for example, according to the numerology of the active BWP.

As an interim value of the application delay may be in terms of the numerology of the target BWP (e.g., the second BWP), the UE may convert a value (e.g., the interim value of the application delay) to time-domain units associated with the first BWP. For example, the conversion may include converting X according to Equation (7). In certain aspects, the value may be based on at least one of the minimum scheduling offset values, for example, the minimum scheduling offset value used for communication with the base station prior to the updated value. In aspects, the value may be based on a default value of a minimum scheduling offset used for communications with the base station. For example, as X=max (Y, Z), Y may be the default value of the minimum schedule offset, such as a fixed value or the smallest value in the TDRA table for the active DL (or UL) BWP. In aspects, the value may be determined according to the various approaches for determining X as described herein with respect to Equations (5) or (6). For example, if the scheduled transmission is for a PDSCH (e.g., a DCI format 1_1 (DL-scheduling DCI) is received on the PDCCH), Y with respect to Equations (5) and (6) may be the minimum value from the minimum scheduling offset values for k0, and if the scheduled transmission is for a PUSCH (e.g., a DCI format 0_1 (UL-scheduling DCI) is received on the PDCCH), Y with respect to Equations (5) and (6) may be the minimum value from the minimum scheduling offset values for k2.

In certain aspects, the application delay for cross-carrier scheduling may be defined according to the numerology of the target BWP. As an example, with respect to operations 1100, the type of scheduling indicated in the signal (for example, as described herein with respect to FIG. 8) may be cross-carrier scheduling such that the signal is received via a first BWP within a first carrier, and the signal further indicates a scheduling offset to be used for communications with the base station via a second BWP within a second carrier that is different from the first carrier. In certain cases, the UE may communicate with the base station based on the scheduling offset. At 1106, the delay (e.g., the application delay) may be determined based on a value (e.g., an interim value of the application delay) in terms of time-domain units associated with the second BWP, for example, according to the numerology of the target BWP.

As the value of the application delay may already be in terms of the time-domain units of the second BWP, the value is not converted according to Equation (7). Expressed another way, the UE may directly apply the value of the application delay in terms of the time-domain units of the target BWP without any conversion step. In certain aspects, the value may be based on at least one of the minimum scheduling offset values, for example, the minimum scheduling offset value used for communication with the base station prior to the updated value. For example, the value may be determined according to the various approaches for determining X as described herein with respect to Equations (5) or (6). In aspects, the value may be based on a default value of a minimum scheduling offset used for communications with the base station. In aspects, the value may be based on at least one of an adjustment term or at least one of the minimum scheduling offset values. For example, the value may be the sum of the adjustment term or at least one of the minimum scheduling offset values. In certain aspects, the adjustment term may be the updated value indicated in the signal.

In certain aspects, the application delay for self-carrier (i.e., intra-carrier) scheduling may be defined according to the numerology of the active BWP. For instance, with respect to operations 1100, the type of scheduling indicated in the signal may be self-carrier scheduling such that the signal is received via a first BWP within a carrier, and the signal further indicates a scheduling offset to be used for communications with the base station via a second BWP within the same carrier. In certain cases, the UE may communicate with the base station based on the scheduling offset. At 1106, the delay (e.g., the application delay) may be determined in terms of time-domain units associated with the first BWP, for example, according to the numerology of the active BWP.

As an interim value of the application delay may be in terms of the numerology of the target BWP (e.g., the second BWP), the UE may convert a value (e.g., the interim value of the application delay) to time-domain units associated with the first BWP based on numerologies of the first BWP and the second BWP. For example, the application delay may be converted to the numerology of the scheduling CC according to Equation (7). In certain aspects, the value may be based on at least one of the minimum scheduling offset values, for example, the minimum scheduling offset value used for communication with the base station prior to the updated value. For example, the value may be determined according to the various approaches for determining X as described herein with respect to Equations (5) or (6). In aspects, the value may be based on a default value of a minimum scheduling offset used for communications with the base station.

In certain aspects, the application delay for self-carrier scheduling may be defined according to the numerology of the target BWP. For instance, with respect to operations 1100, the type of scheduling indicated in the signal may be self-carrier scheduling such that the signal is received via a first BWP within a carrier and, the signal further indicates a scheduling offset to be used for communications with the base station via a second BWP within the same carrier. In certain cases, the UE may communicate with the base station based on the scheduling offset. At 1106, the delay (e.g., the application delay) may be determined based on a value (e.g., the interim value of the application delay) in terms of time-domain units associated with the second BWP.

As the value of the application delay may already be in terms of the time-domain units of the second BWP, the value is not converted according to Equation (7). Expressed another way, the UE may directly apply the value of the application delay in terms of the time-domain units of the target BWP without any conversion step. In certain aspects, the value may be based on at least one of the minimum scheduling offset values, for example, the minimum scheduling offset value used for communication with the base station prior to the updated value. For example, the value may be determined according to the various approaches for determining X as described herein with respect to Equations (5) or (6). In aspects, the value may be based on a default value of a minimum scheduling offset used for communications with the base station. In aspects, the value may be based on at least one of an adjustment term or at least one of the minimum scheduling offset values. For example, the value may be the sum of the adjustment term or at least one of the minimum scheduling offset values. In certain aspects, the adjustment term may be the updated value indicated in the signal.

Aspects of the present disclosure relate to various techniques for determining the scheduling offset in cases where the SCS are different between the scheduling carrier and scheduled carrier, for example, as described herein with respect to FIGS. 10A and 10B. In certain aspects, the PDCCH may only be received in the first half of a slot of the scheduling carrier (e.g., only within the first three symbols of the slot of the scheduling carrier). As an example, with respect to operations 1100, the UE may receive the signal, at 1104, via a first BWP within a first half of a slot of the first BWP, where the signal further indicates a scheduling offset to be used for communications with the base station via a second BWP. In aspects, the UE may receive the signal via three symbols (e.g., the first three symbols) of the slot of the first BWP. In certain cases, the first BWP may have a numerology different than the numerology of the second BWP. In certain cases, the UE may communicate with the base station based on the scheduling offset.

In aspects, the starting position of the minimum scheduling offset may be the slot of the scheduled carrier that intersects with the last symbol of the PDCCH on the scheduling carrier, for example, as described herein with respect to FIG. 10B. As an example, with respect to operations 1100, the UE may receive the signal, at 1104, via a first BWP with a first numerology, where the signal further indicates a scheduling offset to be used for communications with the base station via a second BWP with a second numerology different than the first numerology. The UE may communicate with the base station based on the scheduling offset being relative to a time-domain resource (e.g., a slot, mini-slot, symbol, etc.) of the second BWP, where the time-domain resource intersects with a last time-domain resource of the signal (e.g., the last symbol of a PDCCH).

According to certain aspects, the minimum scheduling offset may be defined in terms of symbols of the scheduled carrier from the last symbol of the scheduling PDCCH. As an example, with respect to operations 1100, the UE may receive the signal, at 1104, via a first BWP with a first numerology, where the signal further indicates a scheduling offset to be used for communications with the base station via a second BWP with a second numerology different than the first numerology. The UE may communicate with the base station based on the scheduling offset and at least one of the minimum scheduling offset values (e.g., the minimum scheduling offset value currently in use prior to the update), where the scheduling offset and at least one of the minimum scheduling offsets are in terms of symbols from a last time-domain resource of the signal (e.g., the last symbol of the PDCCH).

The UE may take various actions if the scheduling offset is less than or equal to the minimum scheduling offset value. As an example, with respect to operations 1100, the signal may further indicate a scheduling offset to be used for communications with the base station. The UE may identify, among the plurality of minimum scheduling offset values, a minimum scheduling offset value used for communications with the base station. The UE may determine a value of the scheduling offset based at least in part on the minimum scheduling offset value (e.g., the value currently in use prior to the update) used for communications with the base station. The UE may communicate with the base station based on a default value (e.g., the value corresponding to '0' (zero) as the 1-bit indication) if the value of the scheduling offset is less than or equal to at least one of the minimum scheduling offset values (e.g., the value currently in use prior to the update).

Figure 12:
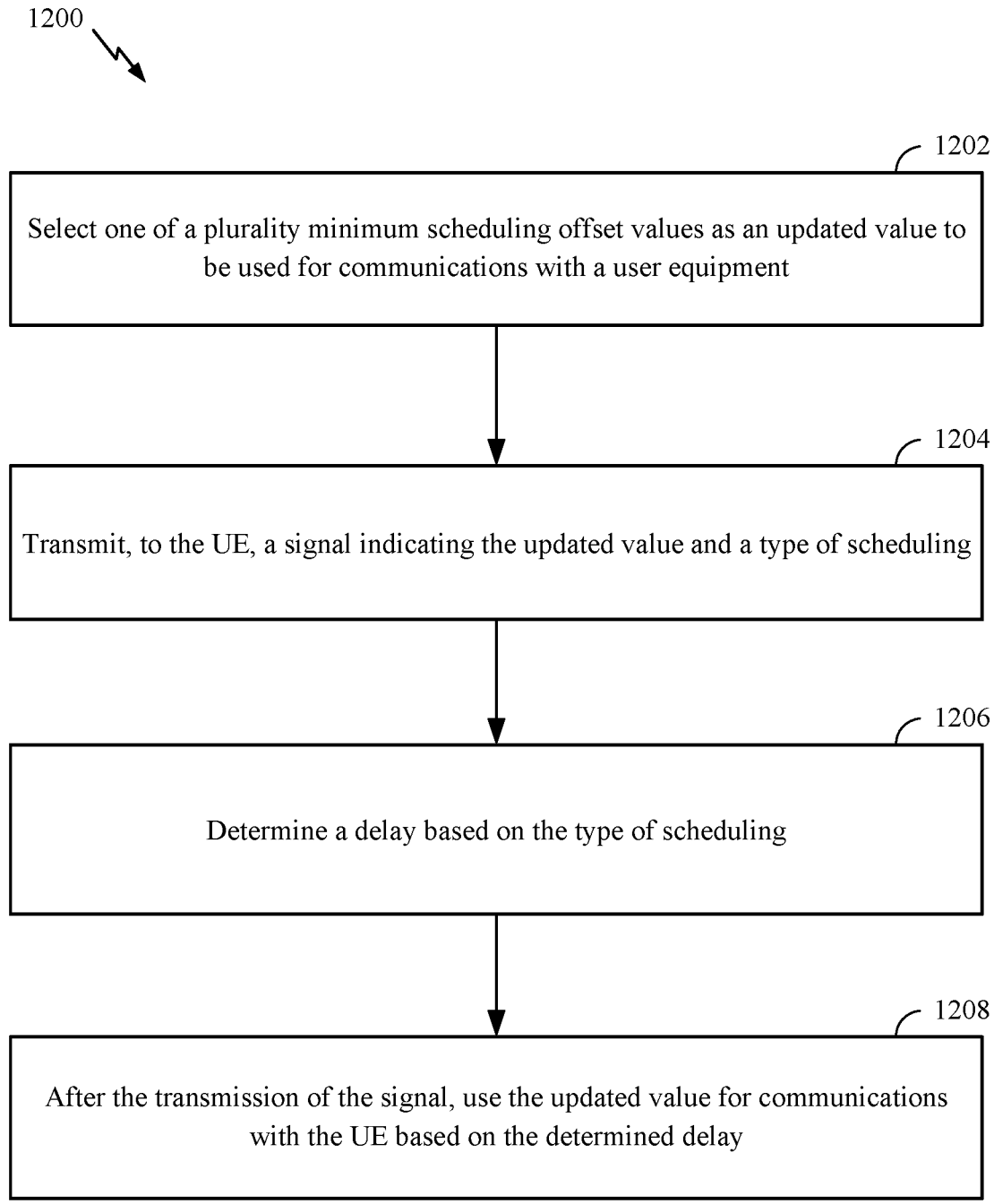
FIG. 12 is a flow diagram illustrating example operations for wireless communication by a BS, in accordance with certain aspects of the present disclosure.

FIG. 12 is a flow diagram illustrating example operations 1200 for wireless communication, in accordance with certain aspects of the present disclosure. The operations 1200 may be performed, for example, by a BS (e.g., the BS 110a in the wireless communication network 100). The operations 1200 may be complimentary to the operations 1100 performed by the BS. Operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 may begin, at 1202, where a base station (e.g., the BS 110a) may select one of a plurality of minimum scheduling offset values as an updated value to be used for communications with a UE (e.g., the UE 120a). At 1204, the base station may transmit, to the UE, a signal (e.g., control signaling including RRC, DCI, and/or MAC-CE signaling) indicating the updated value and a type of scheduling (e.g., cross-carrier scheduling or self-carrier scheduling). At 1206, the base station may determine a a delay (e.g., the application delay determined according to Equations (5), (6), or (7)) based on the type of scheduling. At 1208, the base station may use the updated value for communications with the UE based on the determined delay, after the transmission of the signal.

At 1208, using the updated value for communications with the UE may include the UE communicating with the base station based on the updated value, for example, determining whether scheduling offsets (k0 or k2) satisfy the updated value according to Equation (2). As used herein, communicating with the UE may include, for example, the base station transmitting DL data transmissions to the UE. In other cases, the base station may receive UL data transmissions from the UE. In aspects, the updated value may be used for communications with the UE after the reception of the signal and expiration of a delay (e.g., the application delay) as described herein. As an example, the time-domain resource may include a time-domain resource (e.g., a slot according to the numerology of the PDCCH or the PDSCH/PUSCH) offset from the last time domain resource of the signal by the delay, which may be determined as described herein. In other aspects, the operations 1200 may include the base station transmitting, to the UE, one or more configurations (e.g., an RRC configuration) indicating the plurality of minimum scheduling offset values (for example, as described herein with respect to FIG. 7).

In certain aspects, the application delay for cross-carrier scheduling may be defined according to the numerology of the active BWP. As an example, with respect to operations 1200, the type of scheduling may be cross-carrier scheduling such that the signal is transmitted via a first BWP (e.g., a DL BWP on a PDCCH) within a first carrier (e.g., a component carrier), and the signal further indicates a scheduling offset to be used for communications with the UE via a second BWP (e.g., a DL or UL BWP on a PDSCH or PUSCH) with a second carrier that is different from the first carrier. In certain cases, the base station may communicate with the UE based on the scheduling offset. At 1206, the delay may be determined in terms of time-domain units associated with the first BWP, for example, according to the numerology of the active BWP.

As an interim value of the application delay may be in terms of numerology of the target BWP (e.g., the second BWP), the base station may convert a value (e.g., the interim value of the application delay) to the time-domain units associated with the first BWP. For example, the conversion may include converting X according to Equation (7). In certain aspects, the value may be based on at least one of the minimum scheduling offset values (e.g., the value currently in use prior to the update). In aspects, the value may be based on a default value of a minimum scheduling offset used for communications with the UE. In certain aspects, value may be based on the minimum scheduling offset value used for communication with the base station prior to the updated value. In aspects, the value may be determined according to the various approaches for determining X as described herein with respect to Equations (5) or (6). For example, if the scheduled transmission is for a PDSCH (e.g., a DCI format 1_1 (DL-scheduling DCI) is received on the PDCCH), Y with respect to Equations (5) and (6) may be the minimum value from the minimum scheduling offset values for k0, and if the scheduled transmission is for a PUSCH (e.g., a DCI format 0_1 (UL-scheduling DCI) is received on the PDCCH), Y with respect to Equations (5) and (6) may be the minimum value from the minimum scheduling offset values for k2.

In certain aspects, the application delay for cross-carrier scheduling may be defined according to the numerology of the target BWP. As an example, with respect to operations 1200, the type of scheduling may be cross-carrier scheduling such that the signal is transmitted via a first BWP within a first carrier, and the signal further indicates a scheduling offset to be used for communications with the UE via a second BWP within a second carrier that is different from the first carrier. In certain cases, the base station may communicate with the UE based on the scheduling offset. At 1206, the delay may be determined based on a value (e.g., the interim value of the application delay) in terms of time-domain units associated with the second BWP, for example, according to the numerology of the target BWP.

As the value of the application delay may already be in terms of the time-domain units of the second BWP, the value is not converted according to Equation (7). Expressed another way, the base station may directly apply the value of the application delay in terms of the time-domain units of the target BWP without any conversion step. In certain aspects, the value may be based on at least one of the minimum scheduling offset values, for example, the minimum scheduling offset value used for communication with the base station prior to the updated value. For example, the value may be determined according to the various approaches for determining X as described herein with respect to Equations (5) or (6). In aspects, the value may be based on a default value of a minimum scheduling offset used for communications with the UE. In aspects, the value may be based on at least one of an adjustment term or at least one of the minimum scheduling offset values. For example, the value may be the sum of the adjustment term or at least one of the minimum scheduling offset values. In certain aspects, the adjustment term may be the updated value indicated in the signal.

In certain aspects, the application delay for self-carrier (i.e., intra-carrier) scheduling may be defined according to the numerology of the active BWP. For instance, with respect to operations 1200, the type of scheduling may be self-carrier scheduling such that the signal is transmitted via a first BWP within a carrier, and the signal further indicates a scheduling offset to be used for communications with the UE via a second BWP within the same carrier. In certain cases, the base station may communicate with the UE based on the scheduling offset. At 1206, the delay may be determined in terms of time-domain units associated with the first BWP, for example, according to the numerology of the active BWP.

As an interim value of the application delay may be in terms of the numerology of the target BWP (e.g., the second BWP), the base station may convert a value (e.g., the interim value of the application delay) to time-domain units associated with the first BWP based on numerologies of the first BWP and the second BWP. For example, the application delay may be converted to the numerology of the scheduling CC according to Equation (7). In certain aspects, the value may be based on at least one of the minimum scheduling offset values, for example, the minimum scheduling offset value used for communication with the base station prior to the updated value. For example, the value may be determined according to the various approaches for determining X as described herein with respect to Equations (5) or (6). In aspects, the value may be based on a default value of a minimum scheduling offset used for communications with the UE.

In certain aspects, the application delay for self-carrier scheduling may be defined according to the numerology of the target BWP. For instance, with respect to operations 1100, the type of scheduling may be self-carrier scheduling such that the signal is transmitted via a first BWP within a carrier and further indicates a scheduling offset to be used for communications with the UE via a second BWP within the same carrier. In certain cases, the base station may communicate with the UE based on the scheduling offset. At 1206, the delay may be determined based on a value in terms of time-domain units associated with the second BWP, for example, according to the numerology of the target BWP.

As the value of the application delay may already be in terms of the time-domain units of the second BWP, the value is not converted according to Equation (7). Expressed another way, the base station may directly apply the value of the application delay in terms of the time-domain units of the target BWP without any conversion step. In certain aspects, the value may be based on at least one of the minimum scheduling offset values, for example, the minimum scheduling offset value used for communication with the base station prior to the updated value. For example, the value may be determined according to the various approaches for determining X as described herein with respect to Equations (5) or (6). In aspects, the value may be based on a default value of a minimum scheduling offset used for communications with the UE. In aspects, the value may be based on at least one of an adjustment term or at least one of the minimum scheduling offset values. For example, the value may be the sum of the adjustment term or at least one of the minimum scheduling offset values. In certain aspects, the adjustment term may be the updated value indicated in the signal.

Aspects of the present disclosure relate to various techniques for determining the scheduling offset in cases where the SCS are different between the scheduling carrier and scheduled carrier, for example, as described herein with respect to FIGS. 10A and 10B. In certain aspects, the PDCCH may only be transmitted in the first half of a slot of the scheduling carrier (e.g., only within the first three symbols of the slot of the scheduling carrier). As an example, with respect to operations 1200, base station may transmit the signal via a first BWP within a first half of a slot of the first BWP, where the signal further indicates a scheduling offset to communicate with the UE via a second BWP. In aspects, the base station may transmit the signal via three symbols (e.g., the first three symbols) of the slot of the first BWP. In certain cases, the first BWP may have a numerology different than the numerology of the second BWP. In certain cases, the base station may communicate with the UE based on the scheduling offset.

In aspects, the starting position of the minimum scheduling offset may be the slot of the scheduled carrier that intersects with the last symbol of the PDCCH on the scheduling carrier, for example, as described herein with respect to FIG. 10B. As an example, with respect to operations 1200, the base station may transmit the signal, at 1204, via a first BWP with a first numerology, where the signal further indicates a scheduling offset to be used for communications with the base station via a second BWP with a second numerology different than the first numerology. The base station may communicate with the UE based on the scheduling offset being relative to a time-domain resource (e.g., a slot, mini-slot, symbol, etc.) of the second BWP, where the time-domain resource intersects with a last time-domain resource of the signal (e.g., the last symbol of a PDCCH).

According to certain aspects, the minimum scheduling offset may be defined in terms of symbols of the scheduled carrier from the last symbol of the scheduling PDCCH. As an example, with respect to operations 1200, the base station may transmit the signal, at 1204, via a first BWP with a first numerology, where the signal further indicates a scheduling offset to be used for communications with the base station via a second BWP with a second numerology different than the first numerology. The base station may communicate with the UE based on the scheduling offset and at least one of the minimum scheduling offset values (e.g., the minimum scheduling offset value currently in use prior to the update), where the scheduling offset and at least one of the minimum scheduling offsets are in terms of symbols from a last time-domain resource of the signal (e.g., the last symbol of the PDCCH).

The base station may take various actions if it determines that the scheduling offset is less than or equal to the minimum scheduling offset value. As an example, with respect to operations 1200, the signal may further indicates a scheduling offset to be used for communications with the UE. The base station may determine a value of the scheduling offset based at least in part on the minimum scheduling offset value (e.g., the value currently in use prior to the update) used for communications with the UE. The base station may communicate with the UE based on a default value (e.g., the value corresponding to '0' (zero) as the 1-bit indication) if the value of the scheduling offset is less than or equal to at least one of the minimum scheduling offset values (e.g., the value currently in use prior to the update).

In certain aspects, the base station may implement various techniques for error handling if the base station detects that the UE has not applied the updated minimum scheduling offset according to the application delay as described herein. As an example, with respect to operations 1200, the base station may determine that the UE failed to decode the signal indicating the updated value, for example, due to hybrid automatic repeat request (HARD) operations. Based on this determination, the base station may retransmit, to the UE, the signal indicating the updated value.

Further Example Scheduling Application Delay

In certain aspects, for a DL (or UL) scheduling DCI that indicates an update to the minimum scheduling offset(s) for an active DL BWP and/or an active UL BWP, the earliest slot that can be scheduled based on the updated minimum scheduling offset(s) is given by the following expression:

$$n'+X \quad (8)$$

where:

$$X = \max(Y,Z) + A \quad (9)$$

Y may be at least one of the configured minimum scheduling offset values such as the current minimum k0 (or k2). A may be an adjustment term such as the updated minimum scheduling offset value. Z may be a value that ensures the overall application delay is not too small. For example, the value of Z may be (1, 1, [2], [2]) for SCS of (15, 30, 60, 120) KHz, respectively. In certain aspects, $X=Y+A+Z$ or $X=\max(Y,Z)+\max(A,Z)$ may also provide suitable values for X. In Equation (8), n' may be the slot index in the numerology of the scheduled transmission (e.g., PUSCH or PDSCH), and the relationship of n' to the slot index in the scheduling PDCCH numerology may be given by the following expressions:

$$k0: n' = \left\lceil n \cdot \frac{2^{\mu_{PDSCH}}}{2^{\mu_{PDCCH}}} \right\rceil \quad (10)$$

$$k2: n' = \left\lceil n \cdot \frac{2^{\mu_{PUSCH}}}{2^{\mu_{PDCCH}}} \right\rceil \quad (11)$$

Figure 13A:
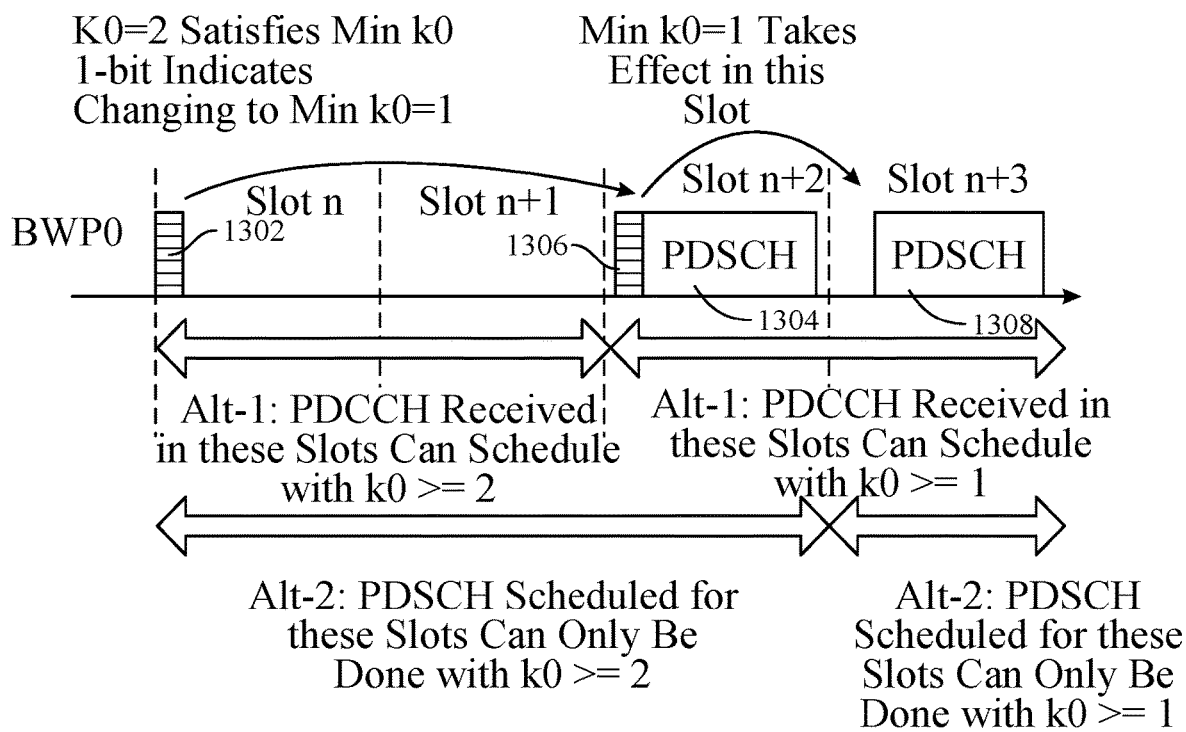
FIG. 13A illustrates an example of scheduling of downlink communications where the minimum scheduling offset is updated, according to certain aspects of the present disclosure.

FIG. 13A illustrates example scheduling of downlink communications where minimum scheduling offset changes from a larger value to a smaller value, and the application delay is determined according to Equation (8), according to certain aspects of the present disclosure. As shown, a UE may receive DCI 1302 from a BS via a control channel (such as a PDCCH) in $slot_n$. The DCI 1302 indicates an updated value for the minimum scheduling offset (e.g., min k0=1 from a current value of min k0=2). The DCI 1302 may also schedule a DL data transmission 1304 on BWP0 at $slot_{n+2}$. In certain aspects, with respect to Equations (8) and (9), Y=2 and A=1, thus, X=sum(2,1)=3. As a result, in this example, the earliest slot that can be scheduled with k0=1 is Slot n+3. The UE may receive DCI 1306 from the BS via a control channel (such as a PDCCH) in $slot_{n+2}$, and the DCI 1306 with a scheduling offset value of 1 may schedule a DL data transmission 1308 on BWP0 at $slot_{n+3}$.

Figure 13B:
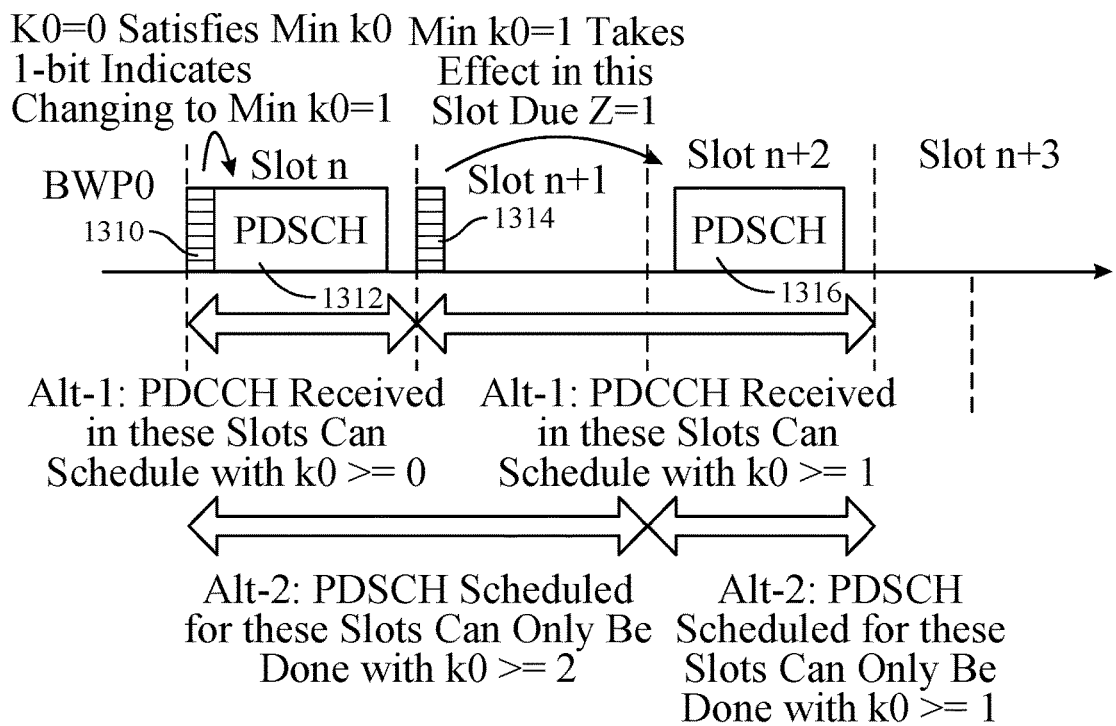
FIG. 13B illustrates another example of scheduling of downlink communications where the minimum scheduling offset is updated, according to certain aspects of the present disclosure.

FIG. 13B illustrates example scheduling of downlink communications where minimum scheduling offset changes from a smaller value to a larger value, and the application delay is determined according to Equation (8), according to certain aspects of the present disclosure. As shown, a UE may receive DCI 1310 from the BS via a control channel (such as a PDCCH) in $slot_n$. The DCI 1310 indicates an updated value for the minimum scheduling offset (e.g., min k0=1 from a current value of min k0=0). The DCI 1310 may also schedule a DL data transmission 1312 on BWP0 at $slot_n$. In certain aspects, with respect to Equations (8) and (9), because the current minimum scheduling offset is zero, assuming Z=1 results in X=max(0, 1)+1=2. In this example, the earliest slot that can be scheduled based on minimum k0=1 is Slot n+2 (i.e., the scheduling PDCCH would have to be transmitted in Slot n+1). The UE may receive DCI 1314 from the BS via a control channel in $slot_{n+1}$, and the DCI 1314 with a scheduling offset value of 1 may schedule a DL data transmission 1316 on BWP0 at $slot_{n+2}$.

For a BWP switch, it may be very useful to indicate the minimum scheduling offset to be used for the target BWP, and the indication can be in the same scheduling DCI that triggers the BWP switch. The existence of the 1-bit field may be based on the current BWP's RRC configuration, it may be expected for most cases, the 1-bit field is present in the DCI, and it may be wasteful to disallow usage for BWP-switch-triggering DCI. In aspects, the DCI that triggers a BWP switch may also indicate the minimum scheduling offset to be used for the target BWP, if the 1-bit field is present in the DCI.

Successive Update of the Minimum Scheduling Offset

With respect to the application delay, successive change of the minimum scheduling offset may be supported. In certain aspects, for example the smallest time scale (e.g., URLLC communications), the minimum scheduling offset may be updated to adapt to variations in the traffic such as high bandwidth bursts. In other cases, if updates to the minimum scheduling offset is enabled and non-zero minimum scheduling offset is used, it means that the introduced additional latency is tolerable at least momentarily. In such cases, successive updates of the minimum scheduling offset may be disabled or not expected.

In certain aspects, the base station may refrain from signaling a successive change to the minimum scheduling offset before the time that the previous change is expected to be applied and/or acknowledged by the UE. For example, the UE may not expect another indication of minimum scheduling offset change in a scheduling DCI if a previous indication is pending to be applied. In another example, the UE may not expect to receive another indication of minimum scheduling offset change in a scheduling DCI for the same active BWP before the time of confirmation for the reception of a previous indication of minimum scheduling offset change. If the previous change indication is carried in a DL scheduling DCI, the time of confirmation is when HARQ-ACK for the scheduled PDSCH is sent. If the previous change indication is carried in a UL scheduling DCI, the time of confirmation is when the scheduled PUSCH is sent. Waiting until the time of HARQ-ACK or PUSCH transmission corresponding to the DCI carrying the previous change indication is robust because this may give an opportunity for the base station and UE to sync up on a minimum scheduling offset change before moving onto another change.

Figure 14:
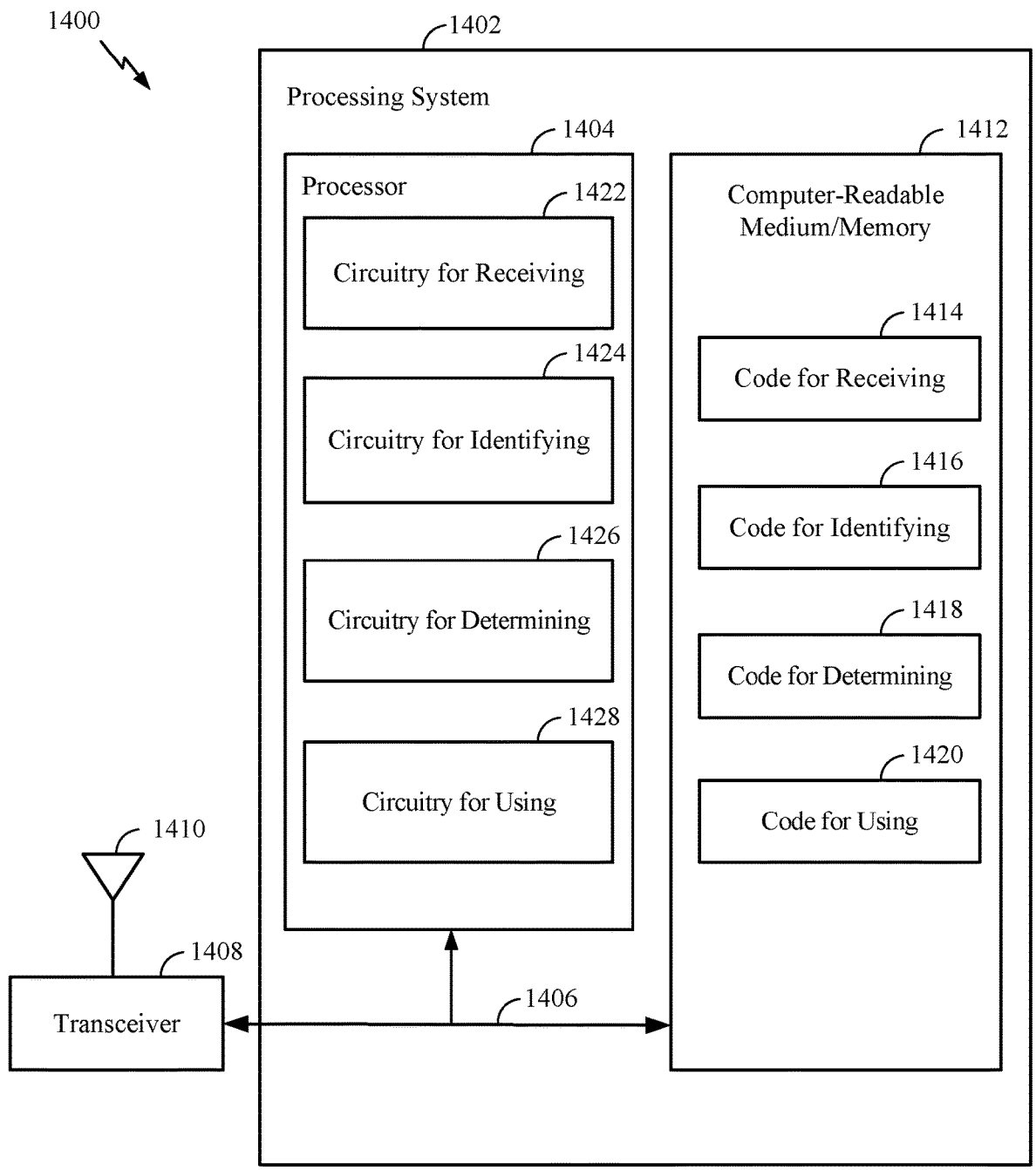
FIG. 14 illustrates a communications device (e.g., a UE) that may include various components configured to perform operations for the techniques disclosed herein in accordance with aspects of the present disclosure.

FIG. 14 illustrates a communications device 1400 (e.g., the UE 120a) that may include various components (e.g., corresponding to means-plus-function components) configured to perform operations for the techniques disclosed herein, such as the operations illustrated in FIG. 11. The communications device 1400 includes a processing system 1402 coupled to a transceiver 1408 (e.g., a transmitter and/or receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for performing the various techniques discussed herein for managing scheduled transmissions. In certain aspects, computer-readable medium/memory 1412 stores code for receiving 1414, code for identifying 1416, code for determining 1418 (including code for converting), and/or code for using 1420 (including code for communicating, code for receiving, and/or code for transmitting). In certain aspects, the processor 1404 has circuitry configured to implement the code stored in the computer-readable medium/memory 1412. The processor 1404 includes circuitry for receiving 1422, circuitry for identifying 1424, circuitry for determining 1426 (including circuitry for converting), and/or circuitry for using 1428 (including circuitry for communicating, circuitry for receiving, and/or circuitry for transmitting).

Figure 15:
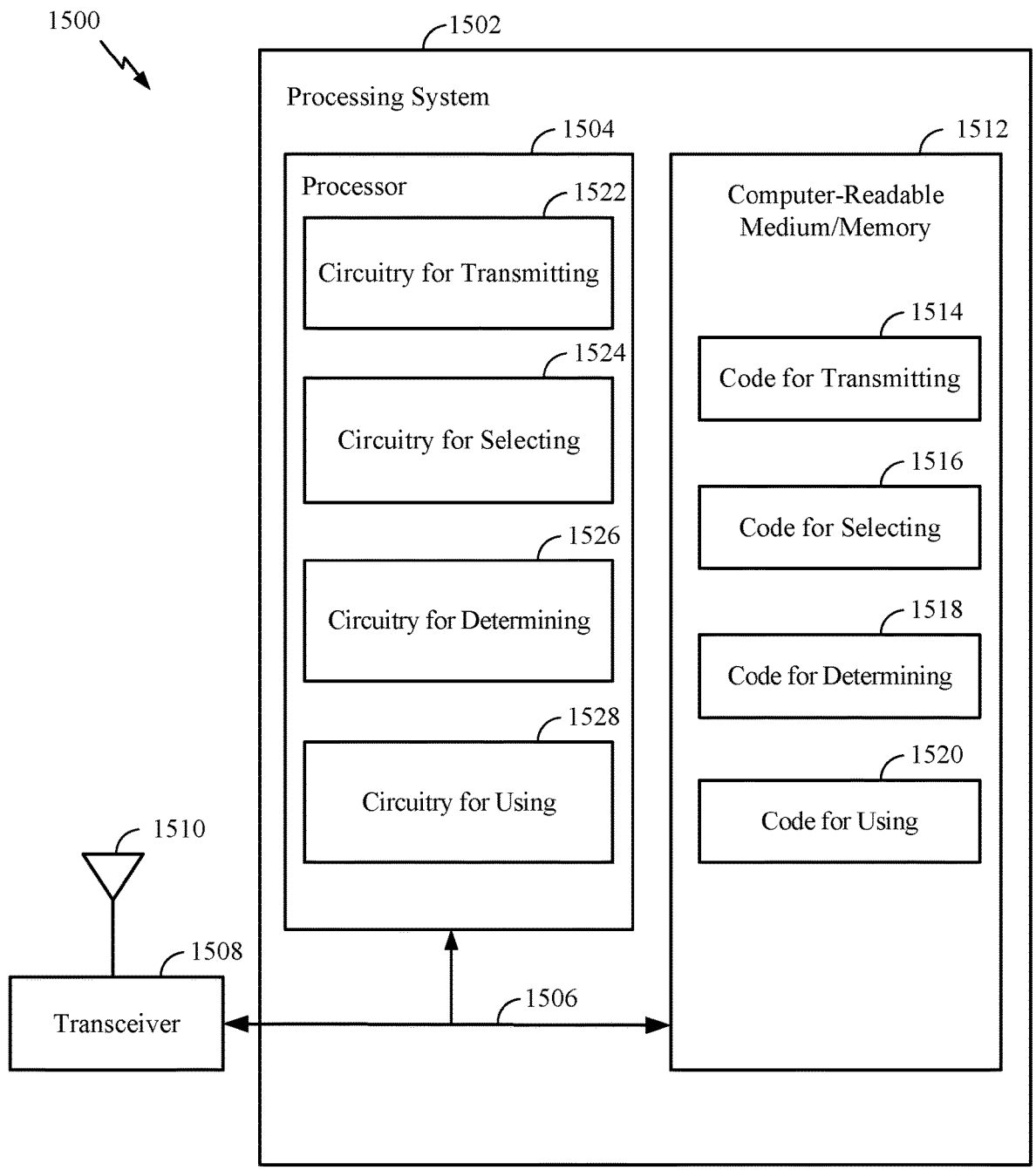
FIG. 15 illustrates a communications device (e.g., a BS) that may include various components configured to perform operations for the techniques disclosed herein in accordance with aspects of the present disclosure.

FIG. 15 illustrates a communications device 1500 (e.g., the BS 110a) that may include various components (e.g., corresponding to means-plus-function components) configured to perform operations for the techniques disclosed herein, such as the operations illustrated in FIG. 12. The communications device 1500 includes a processing system 1502 coupled to a transceiver 1508 (e.g., a transmitter and/or receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12, or other operations for performing the various techniques discussed herein for managing scheduled transmissions. In certain aspects, computer-readable medium/memory 1512 stores code for transmitting 1514, code for selecting 1516, code for determining 1518 (including code for converting), and/or code for using 1520 (including code for communicating, code for receiving, and/or code for transmitting). In certain aspects, the processor 1504 has circuitry configured to implement the code stored in the computer-readable medium/memory 1512. The processor 1504 includes circuitry for transmitting 1522, circuitry for selecting 1524, circuitry for determining 1526 (including circuitry for converting), and/or circuitry for using 1528 (including circuitry for communicating, circuitry for receiving, and/or circuitry for transmitting).

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11 and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications by a user equipment, comprising:
receiving, from a base station, one or more configurations indicating a plurality of minimum scheduling offset values;
receiving, from the base station via a first bandwidth part (BWP) within a first carrier, a signal indicating one of the minimum scheduling offset values as an updated value to be used for communications with the base station and indicating to communicate with the base station via a second BWP within a second carrier that is different from the first carrier;
determining a delay based on numerologies of the first BWP and the second BWP; and
communicating with the base station via the second BWP using the updated value based on expiration of the delay.

2. The method of claim 1, wherein the delay is in terms of time-domain units associated with the first BWP.

3. The method of claim 2, wherein determining the delay further comprises converting the delay to the time-domain units associated with the first BWP based on the numerologies of the first BWP and the second BWP.

4. The method of claim 3, wherein the delay is based on a default value of a minimum scheduling offset used for communications with the base station.

5. The method of claim 3, wherein the delay is based on at least one of the minimum scheduling offset values.

6. The method of claim 3, wherein the delay is based on a ratio of a first numerology of the first BWP to a second numerology of the second BWP.

7. The method of claim 6, wherein the delay is further based on a product of at least one of the minimum scheduling offset values and the ratio.

8. A method of wireless communications by a base station, comprising:
selecting one of a plurality minimum scheduling offset values as an updated value to be used for communications with a user equipment (UE);
transmitting, to the UE via first bandwidth part (BWP) within a first carrier, a signal indicating the updated value and indicating to communicate with the UE via a second BWP within a second carrier that is different from the first carrier;
determining a delay based on numerologies of the first BWP and the second BWP; and
communicating with the base station via the second BWP using the updated value based on expiration of the delay.

9. The method of claim 8, wherein the delay is in terms of time-domain units associated with the first BWP.

10. The method of claim 9, wherein determining the delay further comprises converting the delay to time-domain units associated with the first BWP based on the numerologies of the first BWP and the second BWP.

11. The method of claim 10, wherein the delay is based on a default value of a minimum scheduling offset used for communications with the UE.

12. The method of claim 10, wherein the delay is based on at least one of the minimum scheduling offset values.

13. The method of claim 10, wherein the delay is based on a ratio of a first numerology of the first BWP to a second numerology of the second BWP.

14. The method of claim 13, wherein the delay is further based on a product of at least one of the minimum scheduling offset values and the ratio.

15. An apparatus for wireless communications, comprising:
a transceiver configured to:
receive, from a base station, one or more configurations indicating a plurality of minimum scheduling offset values, and
receive, from the base station via a first bandwidth part (BWP) within a first carrier, a signal indicating one of the minimum scheduling offset values as an updated value to be used for communications with the base station and indicating to communicate with the base station via a second BWP within a second carrier that is different from the first carrier;
a memory; and
one or more processors coupled to the memory, the one or more processors and the memory being configured to determine a delay based on numerologies of the first BWP and the second BWP;
wherein the transceiver is further configured to communicate with the base station via the second BWP using the updated value based on expiration of the delay.

16. The apparatus of claim 15, wherein the delay is in terms of time-domain units associated with the first BWP.

17. The apparatus of claim 16, wherein to determine the delay, the one or more processors and the memory are further configured to convert the delay to the time-domain units associated with the first BWP based on the numerologies of the first BWP and the second BWP.

18. The apparatus of claim 17, wherein the delay is based on a default value of a minimum scheduling offset used for communications with the base station.

19. The apparatus of claim 17, wherein the delay is based on at least one of the minimum scheduling offset values.

20. The apparatus of claim 17, wherein the delay is based on a ratio of a first numerology of the first BWP to a second numerology of the second BWP.

21. The apparatus of claim 20, wherein the delay is further based on a product of at least one of the minimum scheduling offset values and the ratio.

22. An apparatus for wireless communications comprising:
a memory;
one or more processors coupled to the memory, the one or more processors and the memory being configured to select one of a plurality minimum scheduling offset values as an updated value to be used for communications with a user equipment (UE); and
a transceiver configured to transmit, to the UE via first bandwidth part (BWP) within a first carrier, a signal indicating the updated value and indicating to communicate with the UE via a second BWP within a second carrier that is different from the first carrier, wherein:
the one or more processors and the memory are further configured to determine a delay based on numerologies of the first BWP and the second BWP; and
the transceiver is configured to communicate with the UE via the second BWP using the updated value based on expiration of the delay.

23. The apparatus of claim 22, wherein the delay is in terms of time-domain units associated with the first BWP.

24. The apparatus of claim 23, wherein determining the delay further comprises converting the delay to time-domain units associated with the first BWP based on the numerologies of the first BWP and the second BWP.

25. The apparatus of claim 24, wherein the delay is based on a default value of a minimum scheduling offset used for communications with the UE.

26. The apparatus of claim 24, wherein the delay is based on at least one of the minimum scheduling offset values.

27. The apparatus of claim 24, wherein the delay is based on a ratio of a first numerology of the first BWP to a second numerology of the second BWP.

28. The apparatus of claim 27, wherein the delay is further based on a product of at least one of the minimum scheduling offset values and the ratio.

* * * * *